(12) United States Patent
Yamashita

(10) Patent No.: US 8,902,993 B2
(45) Date of Patent: *Dec. 2, 2014

(54) SIGNAL TRANSMISSION APPARATUS AND SIGNAL TRANSMISSION METHOD

(75) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 884 days.

This patent is subject to a terminal disclaimer.

(21) Appl. No.: 13/098,803

(22) Filed: May 2, 2011

(65) Prior Publication Data

US 2011/0273623 A1    Nov. 10, 2011

(30) Foreign Application Priority Data

May 7, 2010    (JP) .................... P2010-107069

(51) Int. Cl.
*H04N 7/12* (2006.01)
*H04N 21/2665* (2011.01)
*H04N 21/236* (2011.01)
*H04N 7/18* (2006.01)
*H04N 21/2187* (2011.01)
*H04N 21/242* (2011.01)

(52) U.S. Cl.
CPC ........... *H04N 7/181* (2013.01); *H04N 21/2665* (2013.01); *H04N 21/23602* (2013.01); *H04N 21/242* (2013.01); *H04N 21/2187* (2013.01)
USPC ....... 375/240.26; 348/441; 348/500; 348/723

(58) Field of Classification Search
None
See application file for complete search history.

(56) References Cited

U.S. PATENT DOCUMENTS

| | | | | |
|---|---|---|---|---|
| 4,967,264 | A | * | 10/1990 | Parulski et al. ............... 348/271 |
| 2009/0213265 | A1 | * | 8/2009 | Yamashita ..................... 348/500 |
| 2009/0290634 | A1 | * | 11/2009 | Yamashita ............... 375/240.01 |
| 2010/0007787 | A1 | * | 1/2010 | Yamashita ..................... 348/441 |

FOREIGN PATENT DOCUMENTS

JP        2005 328494       11/2005

* cited by examiner

*Primary Examiner* — Behrooz Senfi
*Assistant Examiner* — Mohammed Jebari
(74) *Attorney, Agent, or Firm* — Frommer Lawrence & Haug LLP; William S. Frommer

(57) ABSTRACT

A signal transmission apparatus includes: a multiplex unit generating B/Rch by multiplexing image signals read from B, R pixels arranged in the same sample alternately on active regions corresponding to Cch in HD-SDI with a start code similar to SAV or EAV, in which image signals sequentially read in a line direction and inputted with a given number of samples from an imaging device having an RGB full pixel structure in which R, G and B pixels disposed in one sample respectively output R, G and B image signals, as well as generating Gch by sequentially multiplexing image signals read from samples of G pixels adjacent in the line direction on active regions corresponding to Ych in HD-SDI with the start code; and an 8B/10B encoder outputting serial digital data obtained by 8B/10B encoding and converting active regions in the B/R ch and the Gch having the data structure corresponding to HD-SDI as well as auxiliary data regions including SAV, EAV, LN and CRCC.

13 Claims, 12 Drawing Sheets

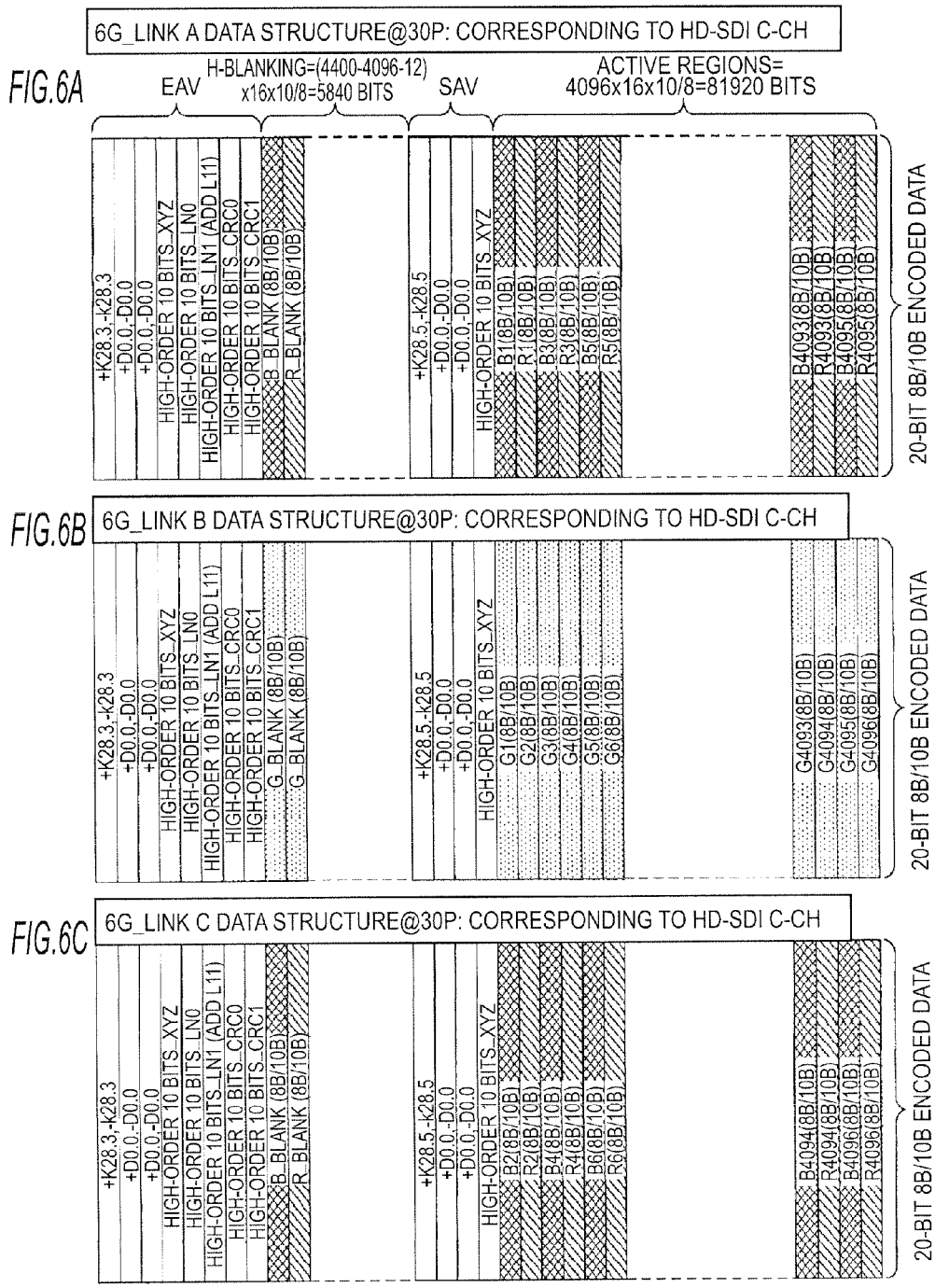

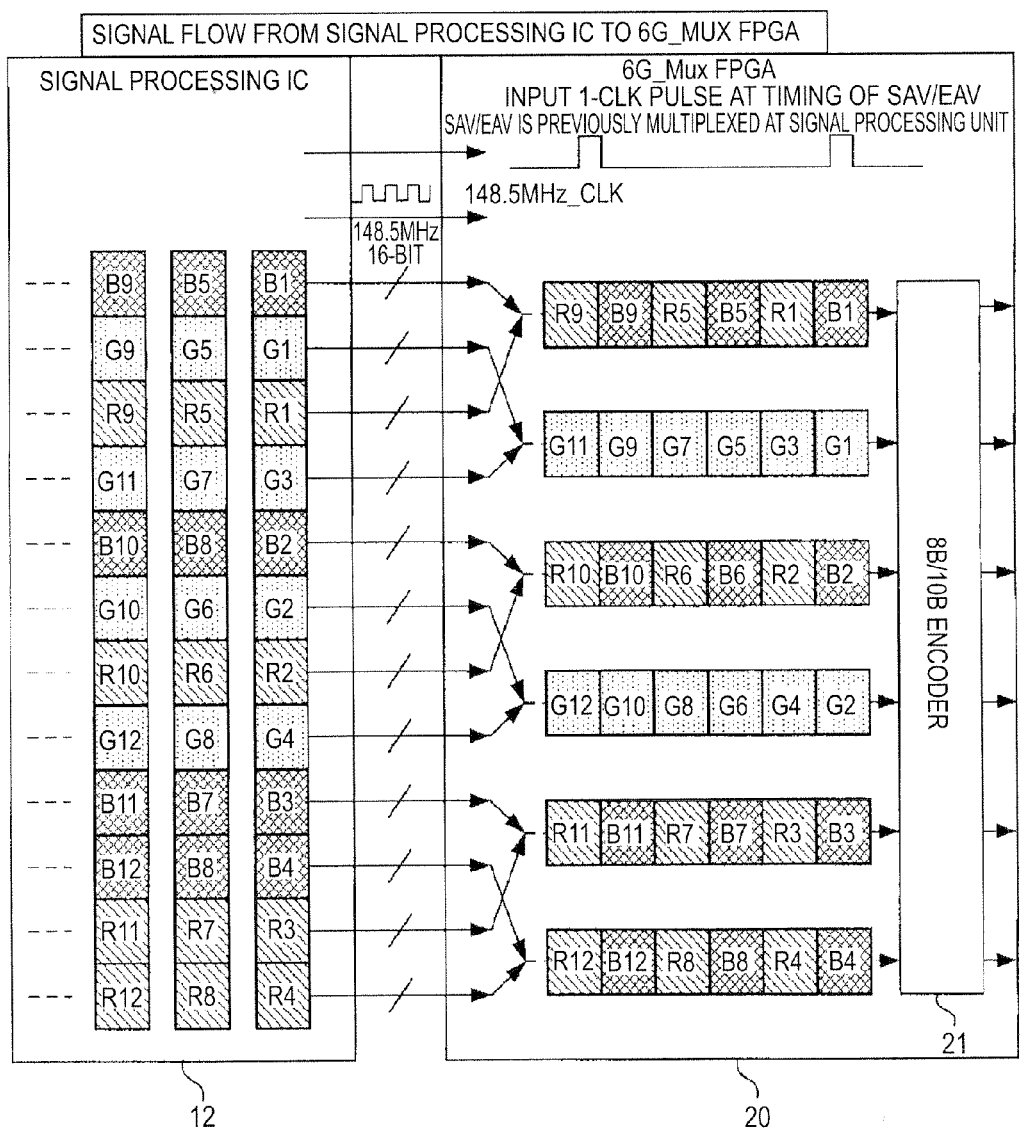

NOTE:
1) 2-BYTE K28.5 IS SUFFICIENT FOR DETECTION OF BYTE BOUNDARY AS ALL DATA IS 8B/10B CONVERTED
2) BITS NOT TO BE USED ARE RESERVED=0 AS ONLY 8B/10B CONVERSION IS PERFORMED
3) 2250 LINES ARE DEFINED BY ADDING LN11 TO LN PRESCRIBED IN SMPTE 292

NOTE:
1) 2-BYTE K28.5 IS SUFFICIENT FOR DETECTION OF BYTE BOUNDARY AS ALL DATA IS 8B/10B CONVERTED
2) BITS NOT TO BE USED ARE RESERVED=0 AS ONLY 8B/10B CONVERSION IS PERFORMED
3) 2250 LINES ARE DEFINED BY ADDING LN11 TO LN PRESCRIBED IN SMPTE 292

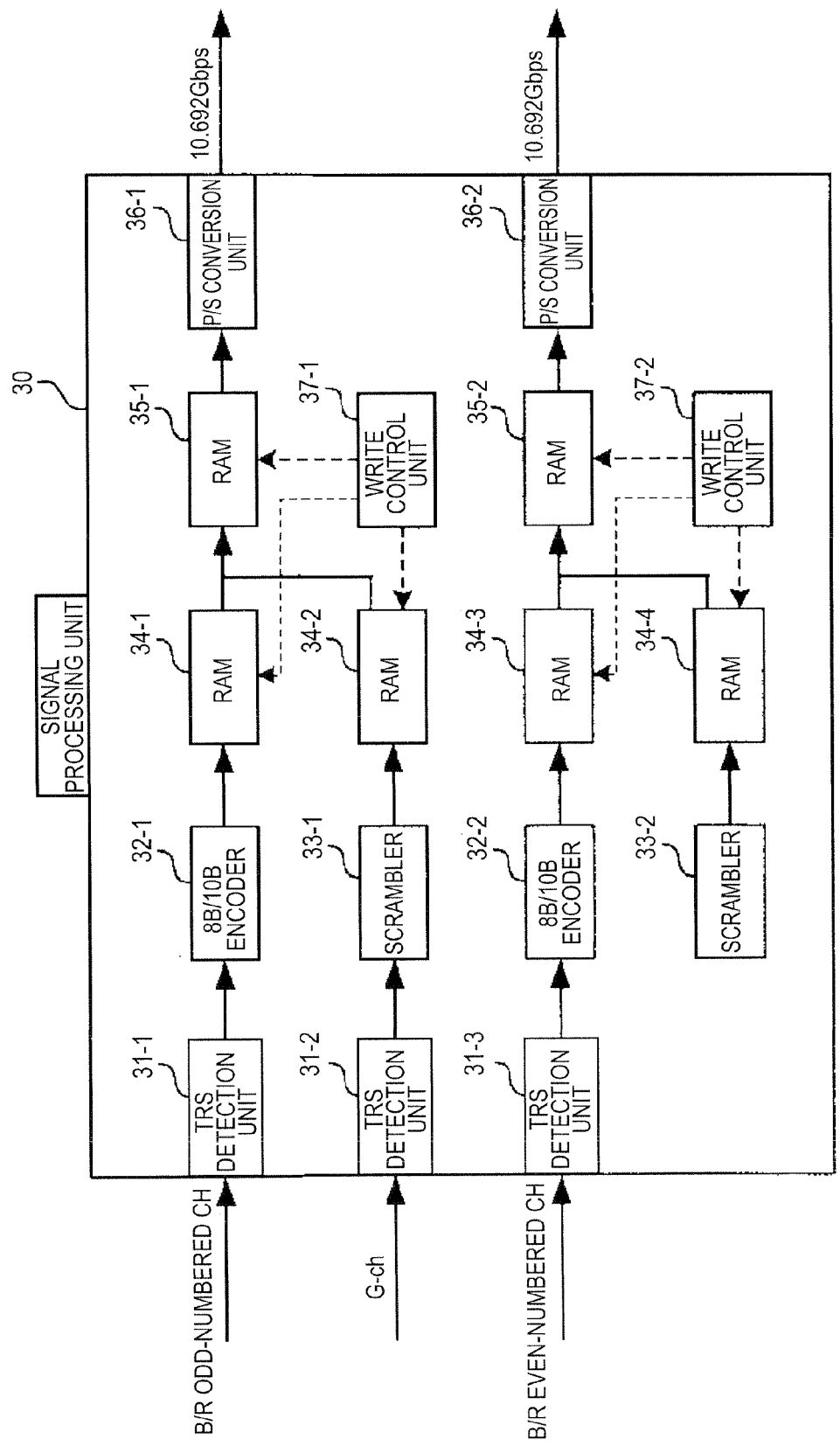

FIG.11A

| |
|---|
| +K28.3,-k28.3(8B/10B) |
| +K28.3,-k28.3(Scr) |
| +D0.0,-D0.0(8B/10B) |
| +D0.0,-D0.0(unScr) |
| +D0.0,-D0.0(8B/10B) |
| +D0.0,-D0.0(unScr) |
| HIGH-ORDER 10 BITS_CXYZ (8B/10B) |
| HIGH-ORDER 10 BITS_YXYZ (SCr) |
| HIGH-ORDER 10 BITS_CLN0 (8B/10B) |
| HIGH-ORDER 10 BITS_YLN0 (SCr) |
| HIGH-ORDER 10 BITS_CLN1 (8B/10B) |
| HIGH-ORDER 10 BITS_YLN1 (SCr) |
| HIGH-ORDER 10 BITS_CCR0 (8B/10B) |
| HIGH-ORDER 10 BITS_YCR0 (SCr) |
| HIGH-ORDER 10 BITS_CCR1 (8B/10B) |
| HIGH-ORDER 10 BITS_YCR1 (SCr) |
| B_BLANK (8B/10B) |
| G_BLANK (SCr) |
| R_BLANK (8B/10B) |
| G_BLANK (SCr) |
| +K28.5,-k28.5(8B/10B) |
| +K28.5,-k28.5(unScr) |
| +D0.0,-D0.0(8B/10B) |
| +D0.0,-D0.0(unScr) |
| +D0.0,-D0.0(8B/10B) |
| +D0.0,-D0.0(unScr) |
| HIGH-ORDER 10 BITS _XYZ (8B/10B) |
| HIGH-ORDER 10 BITS _XYZ (unScr) |
| B2(8B/10B) |
| Scr |
| R2(8B/10B) |
| Scr |
| ⋮ |
| B4096(8B/10B) |
| Scr |
| R4096(8B/10B) |
| Scr |

20-BIT 8B/10B ENCODED DATA
&16-BIT SCRAMBLE DATA

H-BLANKING=(4400-4096-12)x2x16x36/32=10512 BITS

FIG.11B

| |
|---|
| +K28.3,-k28.3(8B/10B) |
| +K28.3,-k28.3(Scr) |
| +D0.0,-D0.0(8B/10B) |
| +D0.0,-D0.0(unScr) |
| +D0.0,-D0.0(8B/10B) |
| +D0.0,-D0.0(unScr) |
| HIGH-ORDER 10 BITS_CXYZ (8B/10B) |
| HIGH-ORDER 10 BITS_YXYZ (SCr) |
| HIGH-ORDER 10 BITS_CLN0 (8B/10B) |
| HIGH-ORDER 10 BITS_YLN0 (SCr) |
| HIGH-ORDER 10 BITS_CLN1 (8B/10B) |
| HIGH-ORDER 10 BITS_YLN1 (SCr) |
| HIGH-ORDER 10 BITS_CCR0 (8B/10B) |
| HIGH-ORDER 10 BITS_YCR0 (SCr) |
| HIGH-ORDER 10 BITS_CCR1 (8B/10B) |
| HIGH-ORDER 10 BITS_YCR1 (SCr) |
| B_BLANK (8B/10B) |
| G_BLANK (SCr) |
| R_BLANK (8B/10B) |
| G_BLANK (SCr) |
| +K28.5,-k28.5(8B/10B) |
| +K28.5,-k28.5(unScr) |
| +D0.0,-D0.0(8B/10B) |
| +D0.0,-D0.0(unScr) |
| +D0.0,-D0.0(8B/10B) |
| +D0.0,-D0.0(unScr) |
| HIGH-ORDER 10 BITS _XYZ (8B/10B) |
| HIGH-ORDER 10 BITS _XYZ (unScr) |
| B1(8B/10B) |
| G1(Scr) |
| R1(8B/10B) |
| G2(Scr) |
| ⋮ |
| B4095(8B/10B) |
| G4095(Scr) |
| R4095(8B/10B) |
| G4096(Scr) |

20-BIT 8B/10B ENCODED DATA
&16-BIT SCRAMBLE DATA

10G DATA STRUCTURE@30P: MULTIPLEX ALL G SAMPLES + B/R ODD-NUMBERED SAMPLES

EAV

SAV  ACTIVE REGIONS=4096x2x16x36/32=147456 BITS

FIG.14
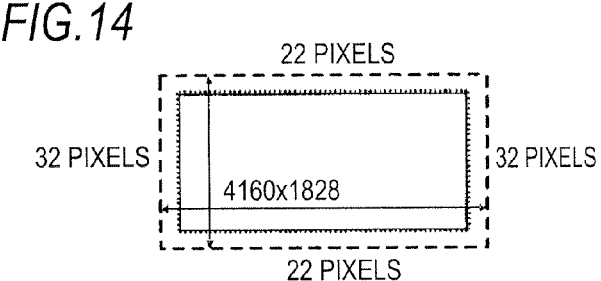
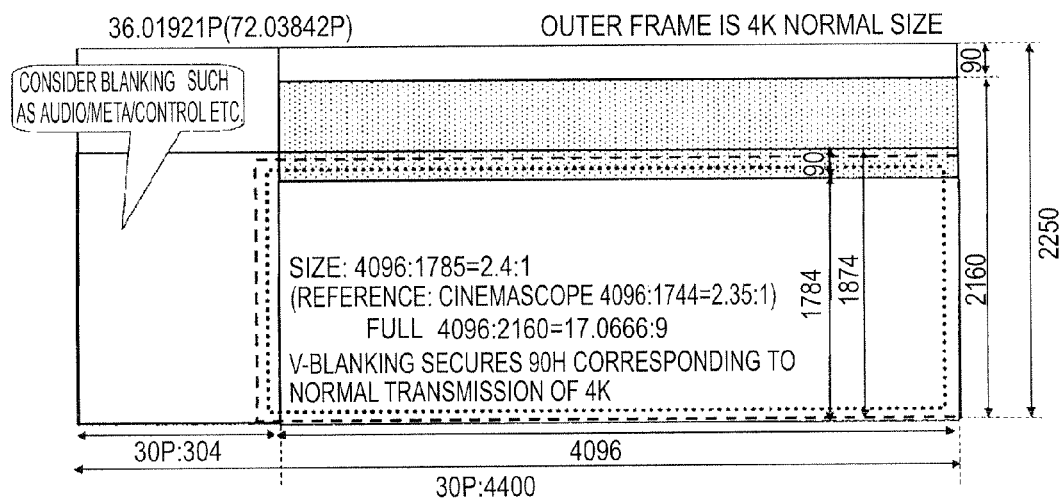
FIG.15
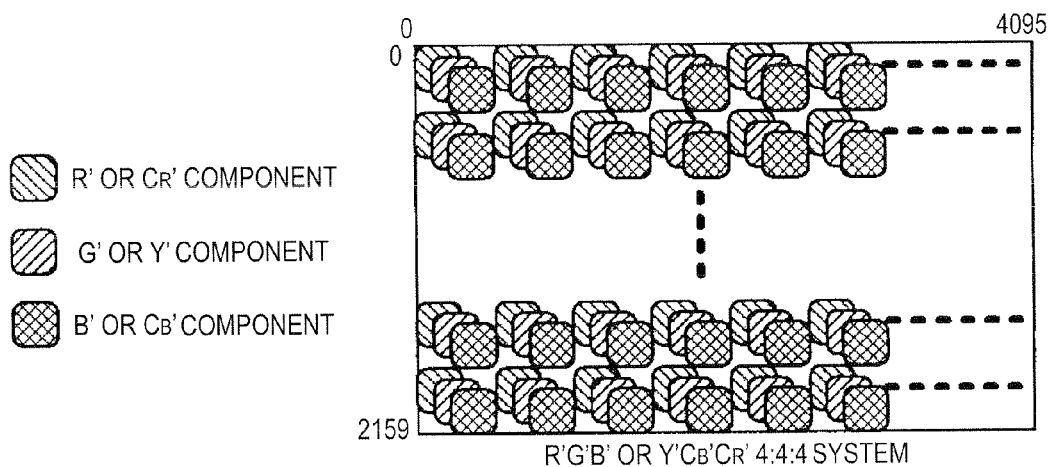

ated in international associations. As international associations, there exist ITU (International Telecommunication Union), SMPTE (Society of Motion Picture and Television Engineers) and so on.

SIGNAL TRANSMISSION APPARATUS AND SIGNAL TRANSMISSION METHOD

BACKGROUND OF THE INVENTION

1. Field of the Invention

The present invention relates to a signal transmission apparatus and a signal transmission method suitable for being applied to a case of transmitting image signals outputted from an image sensor having, for example, an RGB full pixel structure.

2. Description of the Related Art

A receiving system and an imaging system of an ultra-high definition image signal which surpasses an HD (High Definition) signal which is a current image signal (video signal) of 1920 sample×1080 lines per one frame has been hitherto developed. For example, a UHDTV (Ultra High Definition TV) standard which is a next-generation broadcasting format having four-times or sixteen-times the number of pixels of the current HD is standardized in international associations. As international associations, there exist ITU (International Telecommunication Union), SMPTE (Society of Motion Picture and Television Engineers) and so on.

Video standards proposed to ITU and SMPTE relate to image signals of 3840 samples×2160 lines and image signals of 7680 samples×4320 lines which are twice and four times the number of samples and the numbers of lines of the image signal of 1920 samples×1080 lines. The video standard which has been standardized in ITU is called LSDI (Large screen digital imagery), and the video standard which has been proposed to SMPTE is called UHDTV.

A sample structure of pixels in a 4096 horizontal sample, 3840 or 7680 horizontal sample standard prescribed in SMPTE2048-1 and SMPTE2036-0 (UHDTV) will be explained with reference to FIG. 15.

FIG. 15 is an explanatory view showing a system of R', C'B', Y', Cb'Cr', 4:4:4, as an example of the sample structure of the 4096 standards.

In the system, components of RGB or YCbCr are included in all samples.

As a frame used for explanation of FIG. 15, 4096 samples× 2160 lines compose one frame. In the SMPTE standard, signals with dashes such as R', G' and B' denote signals to which gamma correction and so on have been performed.

Heretofore, a broadcasting camera is used as a transmission apparatus transmitting image signals and a CCU (communication control unit) is used as a receiving apparatus receiving the image signals. A double-density Bayer arrangement is used in an imaging device of a currently-used camera which can output a 4 k×2 k signal (an ultra-high definition signal of 4 k samples×2 k lines). Here, in the double-density Bayer arrangement, pixels in a normal Bayer arrangement are arranged so as to be diagonal to one another at (angle of) 45 degrees. Each pixel has a half size of pixels in the normal Bayer structure in vertical and horizontal directions. Therefore, Gch has resolution corresponding to the number of pixels of 4 k×2 k.

A next-generation imaging device is assumed to have an RGB sample structure in the 4096 horizontal sample, 3840 or 7680 horizontal sample standard prescribed in three-plate SMPTE2048-1 or SMPTE2036-1 (UHDTV). However, it is considered that an image signal corresponding to 16-bit in raw data is transmitted from the camera to the CCU (communication control unit), not 10-bit, 12-bit quantization signals prescribed by SMPTE2048-1 or 2036-1 (UHDTV).

In JP-A-2005-328494 (Patent Document 1), a technique of transmitting 3840×2160/30 P, 30/1.001 P/4:4:4/12-bit signals as a kind of the 4 k×2 k signals at a bit rate of 10 Gbps or more is disclosed. A notation of [3840×2160/30 P] represents [the number of pixels in the horizontal direction]×[the number of lines in the vertical direction]/[the number of frames per one second]. A notation of [4:4:4] represents the ratio of [red signal R:green signal G:blue signal B] in the case of a primary-color signal transmission system and represents the ratio of [luminance signal Y:first color-difference signal Cb:second color-difference signal Cr] in the case of a color-difference signal transmission system.

SUMMARY OF THE INVENTION

As frame rates of image signals transmitted between the camera and the CCU, 23.98 P, 24 P, 25 P, 29.97 P, 30 P, 47.95 P, 48 P, 50 P, 59.94 P and 60 P are used, and 16-bit is used as a quantization bit rate in related art. Accordingly, as the number of pixels is increased, power consumption of the camera is also increased. It is requested that raw data (whole data) is transmitted by an optical fiber and the like from a camera in which a remote feeding from the CCU and the like is necessary to a signal processing unit included in the CCU.

However, it is difficult to transmit signals because there has not been a proposal of an interface or an interface data structure for transmitting image signals to be received from an imaging device having the full pixel structure in which RGB pixels are arranged in each sample.

Thus, it is desirable to transmit image signals received from the imaging device having the full pixel structure in which RGB pixels are arranged in each sample by using a current transmission format.

According to an embodiment of the invention, processing is performed to image signals sequentially read in a line direction and inputted with a given number of samples from an imaging device having an RGB full pixel structure in which R, G and B pixels disposed in one sample respectively output R, G and B image signals.

First, image signals read from B, R pixels arranged in the same sample are multiplexed alternately on active regions corresponding to Cch in HD-SDI with a start code similar to SAV or EAV to generate B/Rch.

Additionally, image signals read from G pixels adjacent in the line direction are sequentially multiplexed on active regions corresponding to Ych in HD-SDI with the start code to generate Gch.

Then, serial digital data obtained by 8 B/10 B encoding and converting active regions in the B/R ch and the Gch having the data structure corresponding to HD-SDI as well as auxiliary data regions including SAV, EAV, LN and CRCC is outputted.

According to the above configuration, image signals received from the imaging device having the RGB full pixel structure in which RGB pixels are arranged in each sample can be transmitted by being multiplexed and 8 B/10 B encoded.

According to the embodiment of the invention, image signals read from B, R pixels in image signals received from the imaging device having the RGB full pixel structure are alternately multiplexed on active regions corresponding to Cch in HD-SDI to generate B/Rch. Additionally, image signals read from G-pixels are sequentially multiplexed on active regions corresponding to Ych in HD-SDI to generate Gch. Accordingly, it is possible to transmit image signals in a data format similar to the transmission format of HD-SDI in related art. Furthermore, an advantage of enhancing the convenience can be obtained as transmission lines used in the past can be used.

BRIEF DESCRIPTION OF THE DRAWINGS

FIGS. 6A to 6C are explanatory views showing examples of data structures in which image signals are transmitted at 5.94 Gbps according to the first embodiment of the invention;

FIG. 7 is an explanatory view showing a processing example of signals supplied from a signal processing unit to a 6 G multiplexer FPGA which can process 6 G signals according to a second embodiment of the invention;

FIG. 10 is a block diagram showing an internal configuration example of a signal processing unit according to a third embodiment of the invention;

FIGS. 11A and 11B are explanatory views showing examples of data structures in which image signals are transmitted at 10.692 Gbps according to the third embodiment of the invention;

FIG. 14 is an explanatory view showing an example of CinemaScope according to a fifth embodiment of the invention; and FIG. 15 is an explanatory view showing an example of a sample structure of an UHDTV standard.

DESCRIPTION OF THE PREFERRED EMBODIMENTS

Hereinafter, best modes for carrying out the invention (hereinafter referred to as embodiments) will be explained. The explanation will be made in the following order.

1. First Embodiment (an example of transmitting 4 k×2 k/23.98 P-30 P/4:4:4 (RGB)/16-bit signals at 3 ch 5.94 Gbps by using a 8 B/10 B code)

2. Second Embodiment (an example of transmitting 4 k×2 k/47.95 P-60 P/4:4:4 (RGB)/16-bit signals at 6 ch 5.94 Gbps by using the 8 B/10 B code)

3. Third Embodiment (an example of transmitting 4 k×2 k/23.98 P-30 P/4:4:4 (RGB)/16-bit signals at 2 ch 10.692 Gbps by using the 8 B/10 B code and scramble)

4. Fourth Embodiment (an example of transmitting 4 k×2 k/47.95 P-60 P/4:4:4 (RGB)/16-bit signals at 3 ch 10.692 Gbps by using the 8 B/10 B code and scramble)

5. Fifth Embodiment (an example of transmitting a CinemaScope (aspect ratio 1:2.4) 4 k×2 k/4:4:4 (RGB)/36 P/16-bit signals at 2 ch 10.692 Gbps by using the 8 B/10 B code and scramble)

6. Sixth Embodiment (CinemaScope (aspect ratio 1:2.4) a 4 k×2 k/4:4:4 (RGB)/72 P/16-bit signal at 3 ch 10.692 Gbps by using the 8 B/10 B code and scramble)

1. FIRST EMBODIMENT

An Example of Transmitting 4 k×2 k/23.98 P-30 P/4:4:4 (RGB)/16-Bit Signals at 3 ch 5.94 Gbps by Using a 8 B/10 B Code Hereinafter, a first embodiment of the invention will be explained with reference to FIG. 1 to FIG. 6C.

Here, the example of transmitting 4 k×2 k/23.98 P-30 P/4:4:4 (RGB)/16-bit signals at 3 ch 5.94 Gbps by using a 8 B/10 B code will be explained. In a method of thinning out pixel samples of 4096×2160/23.98 P, 24 P, 25 P, 29.97 P, 30 P/4:4:4, 4:2:2/10-bit, 12-bit, the following abbreviations may be used. That is, 23.98 P, 24 P, 25 P, 29.97 P, 30 P is abbreviated to "23.98 P-30 P". Also, 5.94 G is abbreviated to "6 G". For example, a notation of "4 k×2 k/47.95 P-60 P/4:4:4 (RGB)/16-bit signals" represents the following meaning. That is, the notation means that the imaging device having an RGB full pixel structure includes 4096×2160 pieces of RGB pixels and the frame rate of the image signals is 47.95-60 P, and further, the quantization bit rate of the image signals outputted from the pixels is 16-bit.

Figure 1:
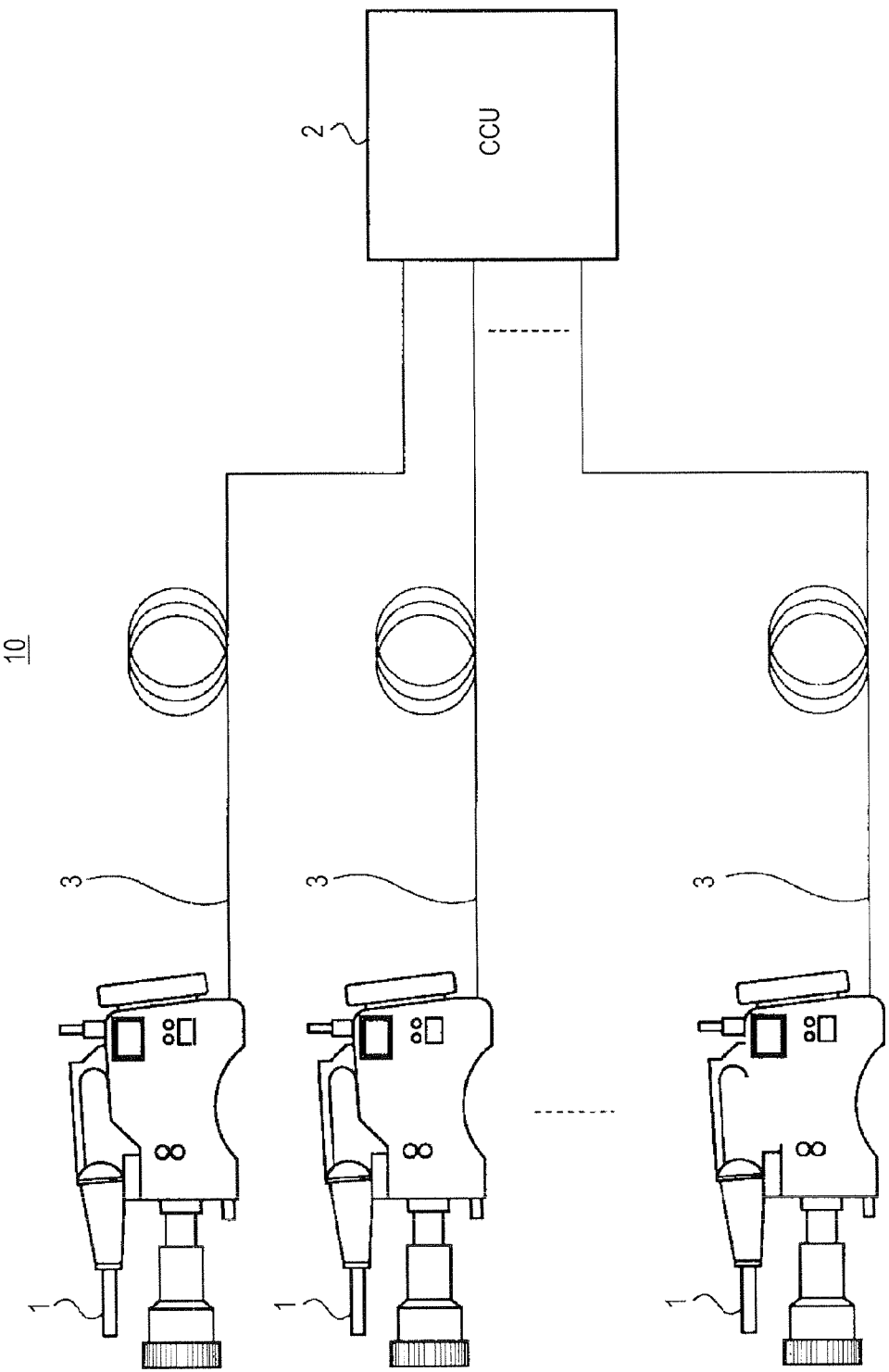
FIG. 1 is a view showing the entire structure of a camera transmission system for television broadcasting according to a first embodiment of the invention.

FIG. 1 is a view showing the entire structure of a signal transmission system 10 for television broadcasting to which the embodiment is applied. The signal transmission system 10 includes plural broadcasting cameras and a CCU 2, in which each camera 1 is connected to the CCU 2 through an optical fiber cable 3. Each camera 1 is used as a signal transmission apparatus which applies a signal transmission method of transmitting a serial digital signal, and the CCU 2 is used as a signal receiving apparatus which applies a signal receiving method of receiving the serial digital signal. The signal transmission system 10 combining the camera 1 and the CCU 2 is used as a signal transmission system transmitting and receiving the serial digital signal.

The cameras 1 have the same structure. Each camera 1 is a camera functioning as the signal transmission apparatus generating 4096×2160/23.98 P-30 P/4:4:4/16-bit signals for digital cinema as 4 k×2 k signals and transmitting the signals to the CCU 2. Hereinafter, the ultra-high definition signals of 4 k samples×2 k lines are referred to as "4 k×2 k signals".

The CCU 2 is a unit controlling respective cameras 1, receiving image signals from respective cameras 1 and transmitting image signals (return video) for displaying video during recording by another camera 1 on monitors of respective cameras 1. The CCU 2 functions as the signal receiving apparatus receiving image signals from respective cameras 1.

Figure 2:
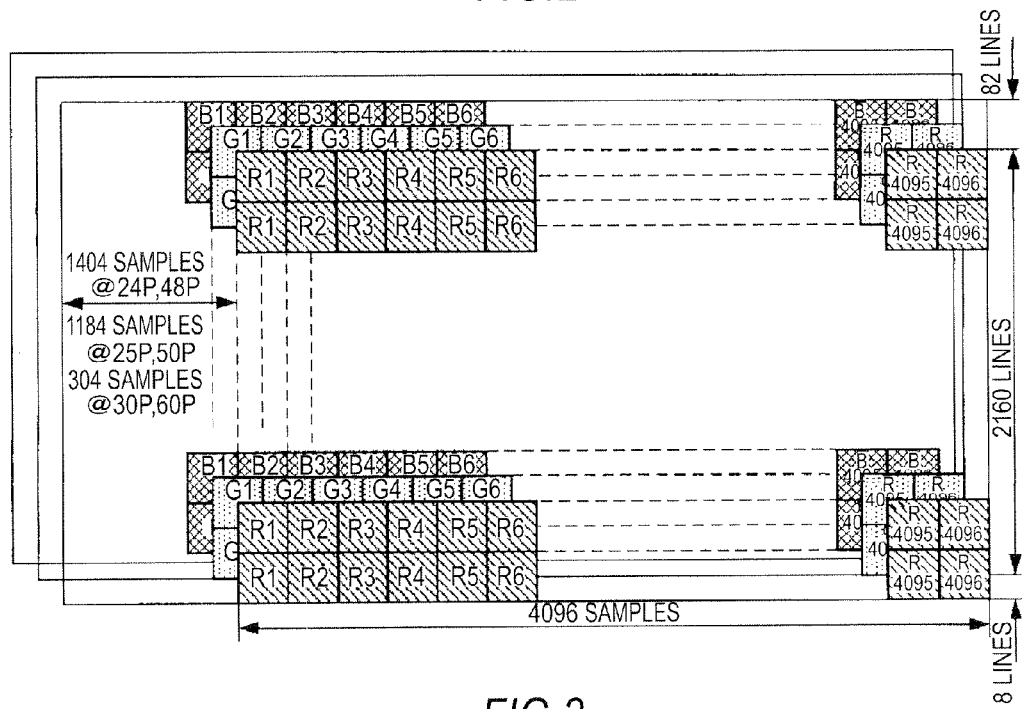
FIG. 2 is an example of image signals outputted from 4 k×2 k pixels of the RGB full pixel structure.

FIG. 2 is an example of image signals outputted from 4 k×2 k pixels of the RGB full pixel structure.

An imaging device in the embodiment (a later described image sensor 11) has the RGB full pixel structure as a pixel arrangement in which R, G and B pixels are arranged in one sample and one sample outputs image signals R, G and B respectively, in which each pixel outputs the image signal in accordance with a given read timing. In the RGB full pixel structure, there are approximately 4 k pieces of R, G, and B pixels respectively in approximately 4 k samples in the horizontal direction.

The number of effective pixels in R, G and B is 4096 pixels respectively and the quantization bit rate is 16-bit. The number of effective samples is 4096 pixels (samples) and the number of effective lines is 2160 lines which is twice that of HD. An 1 H period corresponds to 4400 pixels (in the case of 30 P) which is twice that of HD and a horizontal blanking region corresponds to 4400 pixels–4096=304 pixels. The whole lines are 2250 lines which is twice that of HD and the number of vertical blanking lines corresponds to 2250 lines–2160 line=90 lines.

Figure 5:
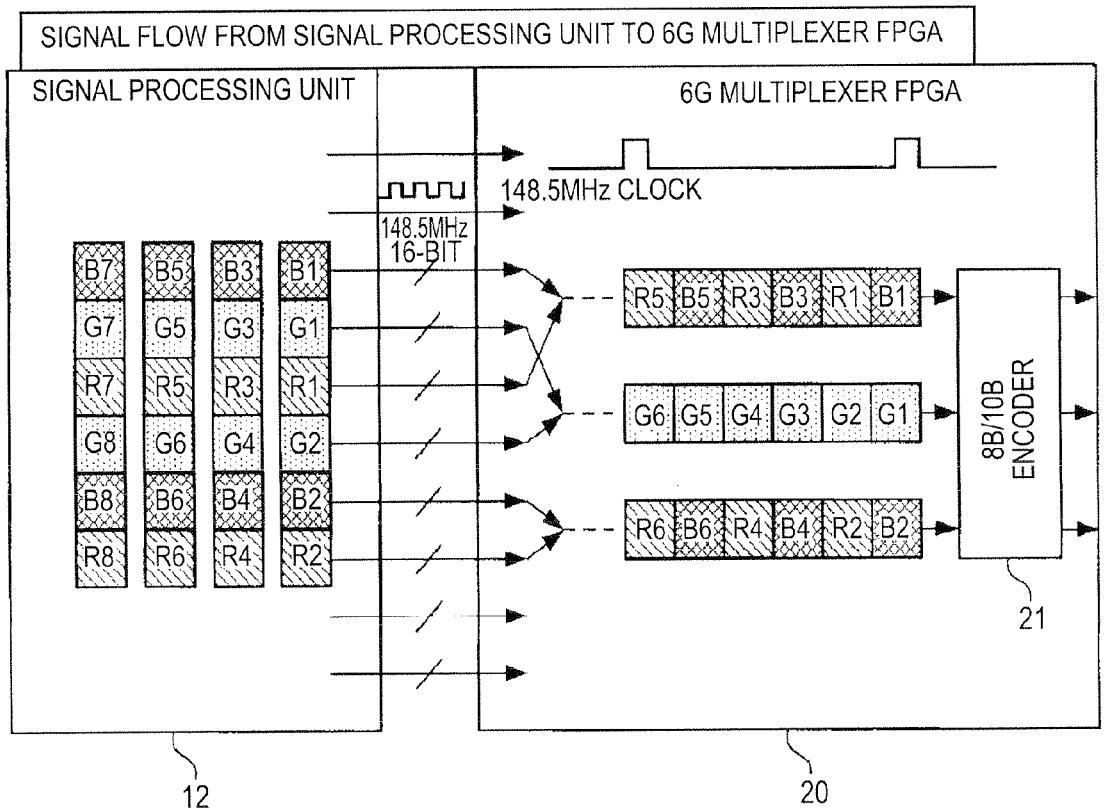
FIG. 5 is an explanatory view showing a processing example of signals supplied from a signal processing unit to a 6 G multiplexer FPGA which can process 6 G signals according to the first embodiment of the invention.

The 4 k×2 k/4:4:4 (RGB) signals are read, for example, in units of 12 pixels from an upper left of the imaging device in the line direction (horizontal direction). A signal processing unit 12 (refer to later-described FIG. 3) outputs image signals read in the unit of 12 pixels by folding the signals as shown in FIG. 5 as data in units of 6 pixels at a 148.5 MHz clock so that a read clock and signal wiring correspond to 60 P signals.

Figure 3:
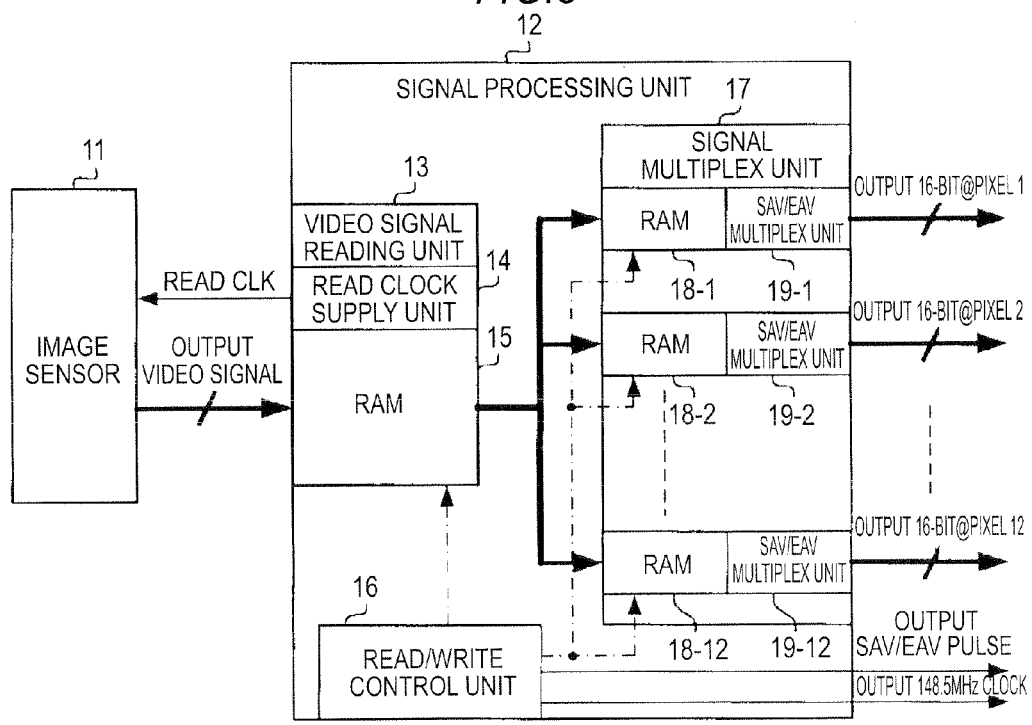
FIG. 3 is a block diagram showing an internal configuration example of a camera according to the first embodiment of the invention.

FIG. 3 shows an internal configuration example of the camera 1.

The camera 1 includes the image sensor 11 having the RGB full pixel structure and the signal processing unit 12 performing processing to image signals received from the image sensor 11 appropriately. As the image sensor 11, for example, a CMOS (Complementary Metal Oxide Semiconductor) sensor, a CCD (Charge Coupled Devices) imager and the like are used. The 4 k×2 k/4:4:4 (RGB) signals of the image sensor 11 are read, for example, in units of 12 pixels from the upper left of the imaging device.

The signal processing unit 12 includes a RAM 15 temporarily storing image signals received from the image sensor 11 and an image signal reading unit 13 reading image signals from the RAM 15. The signal processing unit 12 also includes a read clock supply unit 14 supplying a read clock of image signals to the image sensor 11.

The signal processing unit 12 also includes a read/write control unit 16 controlling processing of reading signals at the image signal reading unit 13 and operation of writing the read image signals into RAMs 18-1 to 18-12.

The signal processing unit 12 further includes a signal multiplex unit 17 multiplexing timing reference signals SAV, EAV by sorting sensor signals. The signal multiplex unit 17 includes RAMs 18-1 to 18-12 and SAV/EAV multiplex units 19-1 to 19-12 for outputting eight lines of image signals. The signal multiplex unit 17 multiplexes data on image signals to be inputted by being read sequentially from the image sensor 11 having the RGB full pixel structure outputting image signals R, G and B from RGB pixels arranged in each sample respectively with a given sample number in the line direction. At this time, the signal multiplex unit 17 multiplexes image signals read from B, R pixels alternately, which are arranged in the same sample in the pixel signals to be inputted on active regions corresponding to Cch in HD-SDI with a start code similar to SAV or EAV to generate B/Rch. At the same time, image signals read from G-pixels in samples adjacent in the line direction are multiplexed in active regions corresponding to Ych in HD-SDI with the start code to generate Gch.

Image signals read from the RAM 15 read by control of the read/write control unit 16 are respectively written into the RAMs 18-1 to 18-12. The RAMs 18-1 to 18-12 are provided so as to correspond to processing of reading image signals in units of eight pixels, and signals are written into the RAMs 18-1 to 18-12 pixel by pixel. The SAV/EAV multiplex units 19-1 to 19-12 multiplexes image signals read from the RAMs 18-1 to 18-12 on SAV/EAV after sorting the signals, then, outputs image signals of 16-bit per pixel.

The read/write control unit 16 not only supplies a write clock to the RAMs 18-1 to 18-12 but also outputs a SAV/EAV pulse and a clock of 148.5 MHz. The pulse and the clock are used in a subsequent not-shown processing unit.

Figure 4:
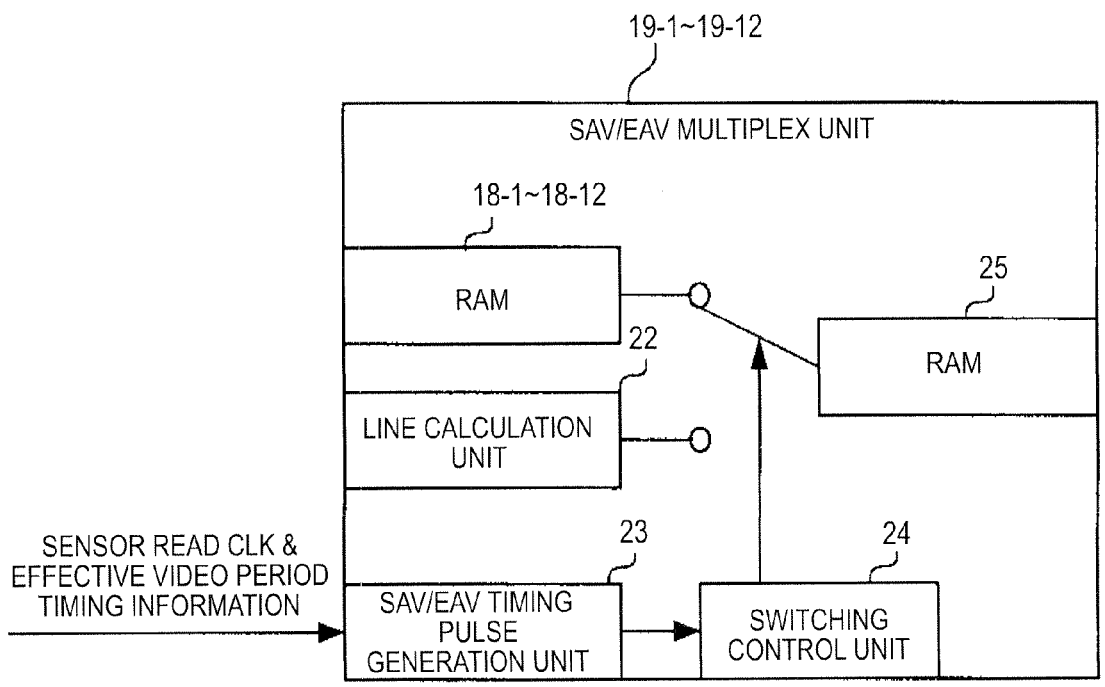
FIG. 4 is a block diagram showing an internal configuration example of a SAV/EAV multiplex unit according to the first embodiment of the invention.

FIG. 4 shows an internal configuration example of the SAV/EAV multiplex units 19-1 to 19-12.

The SAV/EAV multiplex units 19-1 to 19-12 includes a line calculation unit 22 calculating SAV/EAV, LN and CRCC and a SAV/EAV timing pulse generation unit 23 generating a timing pulse for SAV/EAV.

In the RAM 18-1 to 18-12, image signals inputted from the image sensor 11 are stored. The signal receiving apparatus does not recognize breakpoints of the image signals when the image signals are directly transmitted in this state. Therefore, the line calculation unit 22 calculates positions of SAV/EAV/LN and CRCC.

The SAV/EAV timing pulse generation unit 23 receives the read clock for controlling the timing of reading the image signals from the image sensor 11 and timing information of an effective video period from the read/write timing unit 16. The timing information is information is the effective video period in which video data is superimposed on the image signals. Then, the SAV/EAV timing pulse generation unit 23 generates a timing pulse for multiplexing the image signals on the active regions in B/Rch or Gch of HD-SDI.

The SAV/EAV multiplex units 19-1 to 19-12 includes a switching control unit 24 performing control of switching to either RAMS 18-1 to 18-12 or the line calculation unit 22 and writing data in the RAM 25. The switching control unit 24 switches timing of reading the image signals from the image sensor 11 based on the timing pulse received from the SAV/EAV timing pulse generation unit 23. Then, the switching control unit 24 multiplexes the image signals on the active regions in B/Rch or Gch of HD-SDI while switching the reading timing and multiplexes SAV/EAV/LN and CRCC by switching.

FIG. 5 shows a processing example of signals supplied from the signal processing unit 12 to a 6 G multiplexer FPGA 20 which can process 6 G signals. Hereinafter, image signals transmitted at 5.94 Gbps are also referred to as the "6 G signals".

The signal processing unit 12 outputs R signals, G signals and B signals read from respective R, G and B pixels at the same time. The camera 1 includes the 6 G multiplexer FPGA 20, which sorts R, G and B image signals received from the signal processing unit 12 in a prescribed order at each 148.5 MHz clock. The timing pulse is inputted to the 6 G multiplexer FPGA 20 at the timing of SAV/EAV at every clock cycle. SAV/EAV are multiplexed in the signal processing unit 12 in advance. Though the 6 G multiplexer FPGA 20 and the signal processing unit 12 are expressed as separate functional blocks in FIG. 5, the signal multiplex unit 17 of the signal processing unit 12 in FIG. 3 is configured as the 6 G multiplexer FPGA 20 in practice.

The 6 G multiplexer FPGA 20 performs the following processing when the frame rates of the R, G and B image signals inputted from the image sensor 11 are 23.98 P, 24 P, 25 P, 29.97 P and 30 P. In this case, it is necessary that the image sensor 11 has 4096×2160 R, G and B pixels and the quantization bit rate of the image signals outputted from respective pixels is 16-bit.

The 6 G multiplexer FPGA 20 (signal multiplex unit 17) outputs 2 ch serial digital data at 5.94 Gbps, which is obtained by multiplexing image signals on active regions corresponding to Cch in units of respective even numbered samples or odd numbered samples in the B, R pixels read at the same time. The 6 G multiplexer FPGA 20 also output 1 ch serial digital data at 5.94 Gbps, which is obtained by multiplexing image signals on active regions corresponding to Ych in respective adjacent samples of G pixels. Then, an 8 B/10 B encoder 21 performs 8 B/10 B encoding to the active regions in B/Rch and Gch of HD-SDI as well as auxiliary data regions including SAV, EAV, LN and CRCC when 3 ch serial digital data is inputted. After that, the 8 B/10 B encoder 21 outputs serial digital data which has been converted by the 8 B/10 B encoding.

As described above, the 6 G multiplexer FPGA 20 folds the image signals read in units of 12 pixels in the line direction so that a read clock and signal wiring are aligned with 60 P signals as shown in FIG. 5. Then, the 6 G multiplexer FPGA 20 outputs the signals in units of 6 pixels at the 148.5 MHz clock.

Here, the 6 pixels outputted from the 6 G multiplexer FPGA 20 are considered in the following manner.

For example, "B1, R1, B3, R3, B5 and R5" are considered to correspond to Cch of HD.

"G1, G2, G3, G4, G5 and G6" are considered to correspond to Ych of HD.

"B2, R2, B4, R4, B6 and R6" are considered to correspond to Cch of HD.

When the image signals are multiplexed in the above order and are 8 B/10 B converted, respective channels can be transmitted as optical or electric signals at 5.94 Gbps. As described above, data structures of the image signals to be outputted are allowed to correspond to Y/C ch of HD, thereby allowing an engineer familiar with signal processing of HD to comprehend the format easily. This structure also contributes to recognition error in data conversion.

Here, transmission rates in respective frame rates will be calculated.

Calculation of transmission rate in 24 P-30 P $$4400 \text{ pixels} \times 2250 \text{ lines} \times 30 \text{ P} \times 16\text{-bit} \times 10/8 = 5.94 \text{ Gbps} \quad (1)$$

$$5280 \text{ pixels} \times 2250 \text{ lines} \times 25 \text{ P} \times 16\text{-bit} \times 10/8 = 5.94 \text{ Gbps} \quad (2)$$

$$5500 \text{ pixels} \times 2250 \text{ lines} \times 24 \text{ P} \times 16\text{-bit} \times 10/8 = 5.94 \text{ Gbps} \quad (3)$$

In order to identify an effective area including an additional area, a TRS (Timing Reference Signal) signal is multiplexed in the same manner as SAV/EAV of HD to obtain the data structure shown in the following FIGS. 6A to 6C.

FIGS. 6A to 6C show examples of data structures in which image signals are transmitted at 5.94 Gbps.

Here, examples of a data structure of 6 Gbps link A corresponding to Cch of HD-SDI in a frame rate of 30 P and a data structure of 6 Gbps Link B corresponding to Ych of HD-SDI are shown.

FIG. 6A shows an example of data structure in the link A of 5.94 Gbps.

FIG. 6B shows an example of data structure in the link B of 5.94 Gbps.

FIG. 6C shows an example of data structure in the link C of 5.94 Gbps.

In the data structures in the links A, B and C, the signal multiplex unit 17 inserts +k28.5, −k28.5, D0.0, D0.0, D0.0 and D0.0 before 8 B/10 B converted into regions (16-bit) to which SAV of HD-SDI is inserted, in which XYZ is inserted in high order 10 bits. Low 6-bit will be, for example, all "0 (zero)". XYZ is used as a start code of SAV, which is defined by Table 6 of SMPTE274M-2008, FIG. 2 and AnnexE in SMPTE292-2008.

Also in the data structures in the links A, B and C, the signal multiplex unit 17 inserts +k28.3, −k28.3 (any special code of 8 B/10 B codes different from K28.5 multiplexed on SAV can be used), D0.0, D0.0, D0.0 and D0.0 into regions (16-bit) to which EAV of HD-SDI is inserted. Additionally, XYZ is inserted in high order 10 bits, LN0 is inserted in high order 10 bits and LN1 (addition of L11 realizes 2250 lines) is inserted in the high order 10 bits, CRC0 is inserted in the high order 10 bits and CRC1 is inserted in high order 10 bits in regions to which EAV is inserted. Low 6-bit will be, for example, all "0 (zero)".

Here, attention should be paid to the following points.

(1) As all data is 8 B/10 B converted, it is sufficient to provide 2-byte K28.5 for detecting a byte boundary.

(2) As only 8 B/10 B conversion is performed, it does not matter that bits not to be used are reserved (="0 (zero)").

(3) 2250 lines are defined by adding LN11 to LN prescribed in SMPTE 292.

XYZ is prescribed by HD-SDI (SMPTE274M), however, 0/1 prescription of FVH-bit is prescribed based on the effective area of the 4 k×2 k signals of the RGB full pixel structure. For example, V=0 in a range in which the effective lines are 2204 lines and V=1 in a V-blanking area outside the range.

Here, the data amounts of links A, B and C excluding SAV/EAV in H-blanking are calculated.

$$30 \text{ P}:(4400-4096-12(\text{SAV}/\text{EAV}))\times 16\times 10/8=5840 \text{ bits} \quad (1)$$

$$25 \text{ P}:(5280-4096-12(\text{SAV}/\text{EAV}))\times 16\times 10/8=23440 \text{ bits} \quad (2)$$

$$24 \text{ P}:(5500-4096-12(\text{SAV}/\text{EAV}))>16\times 10/8=27840 \text{ bits} \quad 3)$$

In the camera 1 according to the above-explained first embodiment, the 4 k×2 k/23.98 P-30 P4:4:4 (RGB)/16-bit image signals read from the imaging device can be transmitted at 3 ch 5.94 Gbps by using the 8 B/10 B code. The 6 G multiplexer FPGA 20 receives a pulse for identifying SAV/EAV as shown in FIG. 6 at the timing of SAV/EAV prescribed by the data structure shown in FIG. 5. Accordingly, the 6 G multiplexer FPGA 20 can identify the start timing of SAV/EAV by using XYZ multiplexed on SAV, EAV. Therefore, it is not necessary to provide prohibition codes for identifying SAV/EAV in video data, which are prescribed in HD. Here, 000h-003h, 3 FCh-3 FFh at the time of 10-bit, 000h-00Fh, FF0h-FFFh at the time of 12-bit are prohibited to be used in video data as they are used for the TRS or an ANC header, and these regions are referred to as "prohibited codes".

Additionally, data from all "0" to all "1" can be used as the 16-bit image signal. Accordingly, this is extremely effective when there are not prohibited codes (000h-003h, 3FCh-3FFh at the time of 10-bit, 000h-00Fh, FF0h-FFFh at the time of 12-bit) allocated for word synchronization prescribed in HD (SMPTE274M) and prohibited to be used as video data as well as when the quantization bit rate is high in video expression such as 16-bit.

When it is necessary to multiplex an ANC/audio signal, data is multiplexed on the high order 10 bits in 16-bit so as to comply with SMPTE 291, SMPTE 299 and the like which are ANC/audio standards for HD-SDI. The signal multiplex unit 17 multiplexes ANC/audio data in a horizontal auxiliary data space of HD-SDI when the image signal includes ANC/audio data.

2. SECOND EMBODIMENT

An Example of Transmitting 4 k×2 k/47.95 P-60 P/4:4:4 (RGB)/16-Bit Signals at 6 ch 5.94 Gbps by Using the 8 B/10 B Code Next, an operation example of the camera 1 according to a second embodiment of the invention will be explained with reference to FIG. 7 to FIGS. 9A to 9C.

Here, a method of transmitting 4 k×2 k/47.95 P-60 P/4:4:4 (RGB)/16-bit signals at 6 ch 5.94 Gbps by using the 8 B/10 B code will be explained.

FIG. 7 shows an example of multiplexing signals in the 6 G multiplexer FPGA 20 adding given processing to 6 G R, B and G image signals received from the signal processing unit 12 and outputting the signals.

The signal processing unit 12 outputs image signals in units of R, G and B pixels. The 6 G multiplexer FPGA 20 sorts the image signals received from the signal processing unit 12 at each clock of 148.5 MHz. The timing pulse is inputted to the 6 G multiplexer FPGA 20 at every clock cycle at the timing of SAV/EAV.

The 6 G multiplexer FPGA 20 performs the following processing when the frame rate of image signals inputted from the image sensor 11 is 47.95 P-60 P. In this case, it is necessary that the image sensor 11 includes 4096×2160 pixels and the quantization bit rate of the image signals outputted by the pixels is 16-bit.

The 6 G multiplexer FPGA 20 outputs 4 ch serial digital data obtained by multiplexing image signals on active regions corresponding to Cch in units of respective even numbered samples or in units of respective odd numbered samples in the B, R pixel samples read at the same time at 5.94 Gbps. The 6 G multiplexer FPGA 20 also output 2 ch serial digital data at 5.94 Gbps, which is obtained by multiplexing image signals in respective samples of G pixels adjacent in the line direction on active regions corresponding to Ych.

As described above, the 6 G multiplexer FPGA 20 folds the image signals read in units of 12 pixels as shown in FIG. 7 so that the read clock and signal wiring are aligned with 60 P signal. Then, the 6 G multiplexer FPGA 20 outputs the signals in units of 6 pixels at the 148.5 MHz clock.

The 4 k×2 k signals are outputted from, for example, the upper left of the imaging device having the RGB full pixel structure in units of 12 pixels at the 148.5 MHz clock.

Here, 12 pixels outputted by the 6 G multiplexer FPGA 20 are considered as follows.
(1) "B1, R1, B5, R5, B9 and R9" are considered to correspond to Cch of HD
(2) "G1, G3, G5, G7, G9 and G11" are considered to correspond to Ych of HD
(3) "B2, R2, B6, R6, B10 and R10" are considered to correspond to Cch of HD
(4) "G2, G4, G6, G8, G10 and G12" are considered to correspond to Ych of HD
(5) "B3, R3, B7, R7, B11 and R11" are considered to correspond to Cch of HD
(6) "B4, R4, B8, R8, B12 and R12" are considered to correspond to Ych of HD When the signals are multiplexed in the above order and are 8 B/10 B converted, and each "ch" can be transmitted as optical or electric signals at 5.94 Gbps. The data structure corresponds to Y/C ch of HD, thereby allowing the engineer familiar with HD signal processing to comprehend the format easily as well as preventing errors. Additionally, signals in the high 4 pixels can be inputted/outputted with the same wiring and the clock frequency as these of FIG. 3, therefore, switching of the clock frequency is not necessary at the time of switching between the 30 P signal and the 60 P signal, as a result, hardware (circuit scale) can be reduced.

Calculation of transmission rate in 47.95 P-60 P $$4400 \text{ pixels} \div 2 \times 2250 \text{ lines} \times 60 \text{ P} \times 16\text{-bit} \times 10/8 = 5.94 \text{ Gbps} \quad (1)$$

$$5280 \text{ pixels} \div 2 \times 2250 \text{ lines} \times 50 \text{ P} \times 16\text{-bit} \times 10/8 = 5.94 \text{ Gbps} \quad (2)$$

$$5500 \text{ pixels} \div 2 \times 2250 \text{ lines} \times 48 \text{ P} \times 16\text{-bit} \times 10/8 = 5.94 \text{ Gbps} \quad (3)$$

In order to identify an effective area including an additional area, a TRS (Timing Reference Signal) signal is multiplexed in the same manner as the SAV/EAV of HD to obtain the data structure shown in FIGS. 6A to 6C.

In the data structure in the links A, B in the embodiment, +k28.5, −k28.5, D0.0, D0.0, D0.0 and D0.0 before 8 B/10 B converted are inserted into SAV (16-bit) instead of SAV/EAV of HD-SDI, in which XYZ is inserted in high order 10 bits.

In the data structure in the links A, B, +k28.3, −k28.3, D0.0, D0.0, D0.0 and D0.0 before 8 B/10 B converted are inserted into EAV (16-bit). Additionally, XYZ is inserted in high order 10 bits, LN0 is inserted in high order 10 bits and LN1 (addition of L11 realizes 2250 lines) is inserted in the high order 10 bits, CRC0 is inserted in the high order 10 bits and CRC1 is inserted in high order 10 bits.

Here, attention should be paid to the following points.
(1) As all data is 8 B/10 B converted, it is sufficient to provide 2-byte K28.5 for detecting a byte boundary.
(2) As only 8 B/10 B conversion is performed, bits not to be used are reserved, it does not matter that bits not to be used are reserved (="0 (zero)").
(3) 2250 lines are defined by adding LN11 to LN prescribed in SMPTE 292

XYZ is prescribed by HD-SDI (SMPTE274), however, 0/1 prescription of FVH-bit is prescribed based on the effective area of 4 k×2 k signals of the RGB full pixel structure. For example, V=0 in a range in which the effective lines are 2160 lines and V=1 in a V-blanking area outside the range.

Calculation of the data amounts of 6 G_links A, B, C and D excluding SAV/EAV in H-blanking are calculated.

$$60 \text{ P}:(2200-2048-12(\text{SAV/EAV}))\times 16\times 10/8=2800 \text{ bits} \quad (1)$$

$$50 \text{ P}:(2640-2048-12(\text{SAV/EAV}))\times 16\times 10/8=11600 \text{ bits} \quad (2)$$

$$48 \text{ P}:(2750-2048-12(\text{SAV/EAV}))\times 16\times 10/8=13800 \text{ bits} \quad (3)$$

FIGS. 8A to 8C and FIGS. 9A to 9C show data structures correspond to Cch, Ych of HD-SDI.

Figure 8A:
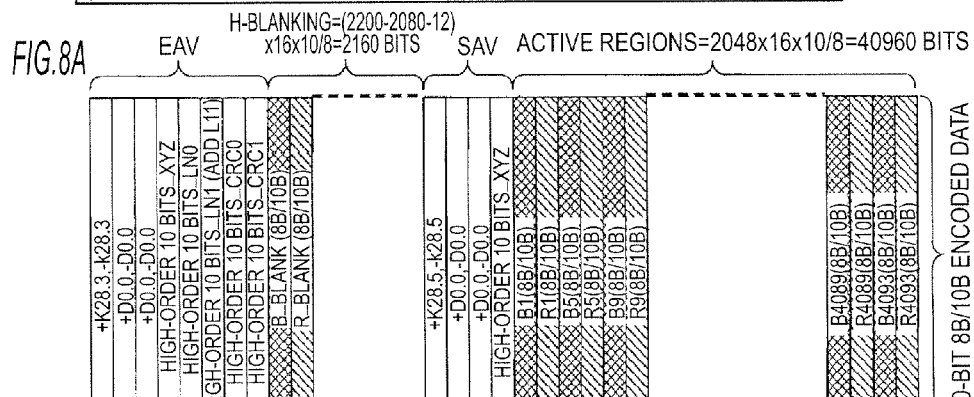
FIGS. 8A to 8C are explanatory views showing example of data structures (6 G_Link A to C) in which image signals are transmitted at 5.94 Gbps according to the second embodiment of the invention.

FIG. 8A shows only 1, 5, 9, . . . samples in the data structure of the link A of 6 Gbps corresponding to Cch of HD-SDI.

Figure 8B:
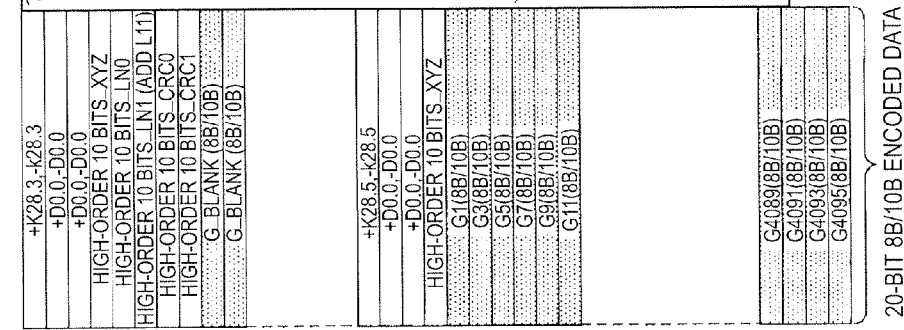

FIG. 8B shows only odd-numbered samples in the data structure of the link B of 6 Gbps corresponding to Ych of HD-SDI.

Figure 8C:
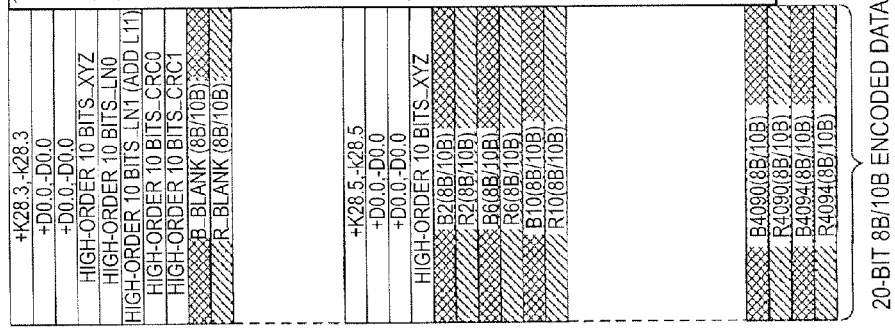

FIG. 8C shows only 2, 6, 10, . . . samples in the data structure of the link C of 6 Gbps corresponding to Cch of HD-SDI.

Figure 9A:
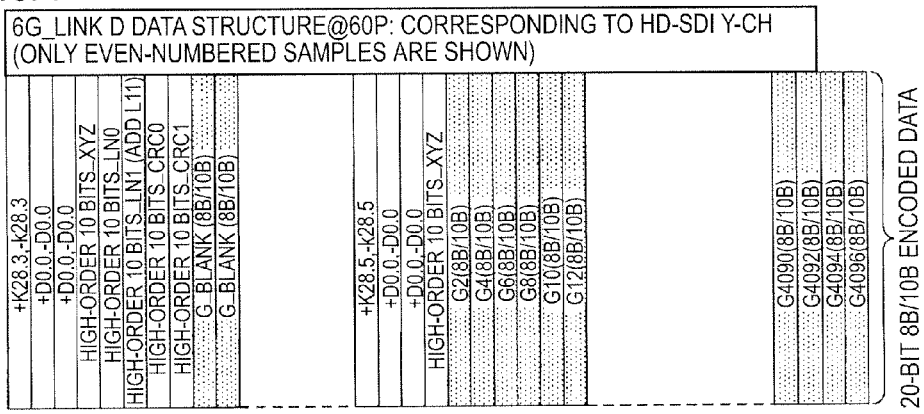
FIGS. 9A to 9C are explanatory views showing example of data structures (6 G_Link D to F) in which image signals are transmitted at 5.94 Gbps according to the second embodiment of the invention.

FIG. 9A shows only even-numbered samples in the data structure of the link D of 6 Gbps corresponding to Ych of HD-SDI.

Figure 9B:
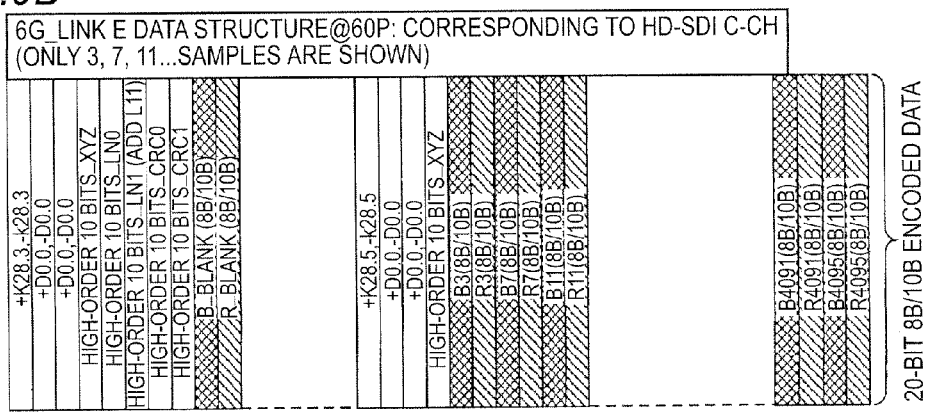

FIG. 9B shows only 3, 7, 11, . . . samples in the data structure of the link E of 6 Gbps corresponding to Cch of HD-SDI.

Figure 9C:
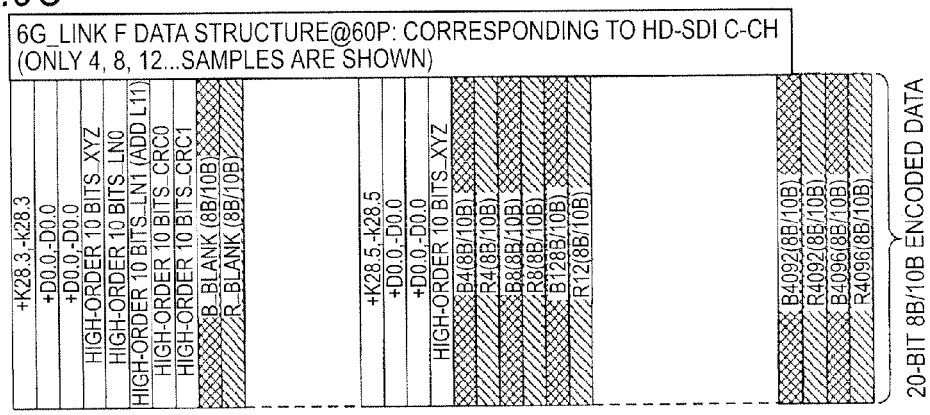

FIG. 9C shows only 4, 8, 12, . . . samples in the data structure of the link F of 6 Gbps corresponding to Cch of HD-SDI.

Here, the odd-numbered samples indicate odd-numbered samples of G, the even-numbered samples indicate even-numbered samples of G.

In the camera 1 according to the second embodiment described above, 4 k×2 k/47.95 P-60 P/4:4:4 (RGB)/16-bit image signals read from the imaging device can be transmitted at 6 ch 5.94 Gbps by using the 8 B/10 B code. The 6 G multiplexer FPGA 20 receives a pulse for identifying SAV/EAV as shown in FIG. 7 at the timing of SAV/EAV prescribed by the data structure shown in FIGS. 8A to 8C. Accordingly, the 6 G multiplexer FPGA 20 can identify the start timing of SAV/EAV by using XYZ shown in FIGS. 8A to 8C and FIGS. 9A to 9C. Therefore, it is not necessary to provide prohibition codes (000h-003h, 3FCh-3FFh at the time of 10-bit, 000h-00Fh, FF0h-FFFh at the time of 12-bit) for identifying SAV/EAV in video data.

Additionally, data from all "0" to all "1" can be used as the 16-bit image signals. This is extremely effective when the quantization bit rate is high in video expression such as 16-bit.

When it is necessary to multiplex the ANC/audio signal, data is multiplexed on the high order 10 bits in 16-bit so as to comply with SMPTE 291, SMPTE 299 and the like which are ANC/audio standards for HD-SDI.

3. THIRD EMBODIMENT

An Example of Transmitting 4 k×2 k/23.98 P-30 P/4:4:4 (RGB)/16-Bit Signals at 2 ch 10.692 Gbps by Using a 8 B/10 B Code and Scramble Next, an operation example of the camera 1 according to a third embodiment of the invention will be explained with reference to FIG. 10 and FIGS. 11A and 11B.

Here, a method of transmitting 4 k×2 k/23.98 P-30 P/4:4:4 (RGB)/16-bit signals at 2 ch 10.692 Gbps by using the 8 B/10 B code and scramble will be explained.

FIG. 10 shows an internal configuration example of a signal processing unit 30.

The signal processing unit 30 receives 4 k×2 k signals or signals obtained by multiplexing the signals to 3 ch 5.94 Gbps from the signal processing unit 12. Then, the signal processing unit 30 includes a TRS detection unit 31-1 detecting the multiplexed TRS from the signals having the data structure corresponding to HD-SDI in a B/R odd-numbered channel inputted from the signal multiplex unit 17. The signal processing unit 30 also includes a TRS detection unit 31-2 detecting the multiplexed TRS from the signals having the data structure corresponding to HD-SDI in Gch inputted from the signal multiplex unit 17. The signal processing unit 30 also includes a TRS detection unit 31-3 detecting the multiplexed TRS from the signals having the data structure corresponding to HD-SDI in a B/R even-numbered channel.

Moreover, the signal processing unit 30 includes an 8 B/10 B encoder 32-1 performing 8 B/10 B encoding to active regions of the signal having the data structure corresponding to HD-SDI in the B/R odd-numbered channel in which the TRS has been detected by the TRS detection unit 31-1. The signal processing unit 30 also includes a RAM 34-1 storing data to which 8 B/10 B encoding has been performed.

The signal processing unit 30 includes an 8 B/10 B encoder 32-2 performing 8 B/10 B encoding to active regions of the signal having the data structure corresponding to HD-SDI in the B/R even-numbered channel in which the TRS has been detected by the TRS detection unit 31-3. The signal processing unit 30 also includes a RAM 34-3 storing data to which 8 B/10 B encoding has been performed.

The signal processing unit 30 includes a scrambler 33-1 performing frame synchronization scrambling to the active regions of the signal having the data structure corresponding to HD-SDI in Gch in which the TRS has been detected by the TRS detection unit 31-2. The signal processing unit 30 also includes a RAM 34-2 storing scrambled data.

The signal processing unit 30 further includes a scrambler 33-2 performing frame synchronization scrambling to the active regions of an optional signal (for example, all "0") and a RAM 34-4 storing scrambled data.

The signal processing unit 30 includes a RAM 35-1 storing data read from the RAMs 34-1, 34-2 in a given data structure. Writing and reading of data with respect to the RAMs 34-1, 34-2 and 35-1 are performed by control of a write control unit 37-1. The signal processing unit 30 also includes a parallel/serial conversion unit 36-1 converting data read from the RAM 35-1 from parallel data to digital data. The parallel/serial conversion unit 36-1 converts parallel digital data which is inputted in parallel from the 8 B/10 B encoder 32-1 and the scrambler 33-1 into serial digital data to output the data at a transmission stream of 10.692 Gbps.

The signal processing unit 30 further includes a RAM 35-2 storing data read from the RAMs 34-3, 34-4 in a given data structure. Writing and reading of data with respect to the RAMs 34-3, 34-4 and 35-2 are performed by control of a write control unit 37-2. The signal processing unit 30 also includes a parallel/serial conversion unit 36-2 converting data read from the RAM 35-2 from parallel data to digital data. The parallel/serial conversion unit 36-2 converts parallel digital data which is inputted in parallel from the 8 B/10 B encoder 32-2 and the scrambler 33-2 into serial digital data to output the data at the transmission stream of 10.692 Gbps.

Next, an operation example of the signal processing unit 30 will be explained.

The signal processing unit 30 performs the following processing when the frame rates of the image signals inputted from the image sensor 11 are 23.98 P, 24 P, 25 P, 29.97 P and 30 P. In this case, it is necessary that the image sensor 11 includes 4096×2160 pixels and the quantization bit rate of image signals outputted by the pixels is 16-bit.

When the TRS detection unit 31-1 receives 4 k×2 k signals of the RGB full pixel structure or signals obtained by multiplexing the signals to 2 ch 5.94 Gbps from the 6 G multiplexer FPGA 20, the TRS detection unit 31-1 detects SAV, EAV from the TRS signal and encodes the signals by 8 B/10 B. The 8 B/10 B encoder 32-1 performs 8 B/10 B conversion from the head of SAV with respect to the B/R odd-numbered channel. At this time, the 8 B/10 B encoder 32-1 converts image signals of respective pixels into the 20-bit data length and stores the signals in the RAM 34-1.

Similarly, when the TRS detection unit 31-3 receives 4 k×2 k signals of the RGB full pixel structure or signals obtained by multiplexing the 4 k×2 k signals to 2 ch 5.94 Gbps from the 6 G multiplexer FPGA 20, the TRS detection unit 31-3 detects SAV, EAV from the TRS signal and encodes the signals by 8 B/10 B. The 8 B/10 B encoder 32-2 performs 8 B/10 B conversion from the head of SAV with respect to the B/R even-numbered channel. At this time, the 8 B/10 B encoder 32-2 converts pixel signals of respective pixels into the 20-bit data length and stores the signals in the RAM 34-3.

On the other hand, when the TRS detection unit 31-2 receives image signals of Gch, the TRS detection unit 31-2 detects SAV, EAV from the TRS signal and encodes the signals by 8 B/10 B, and the scrambler 33-1 performs frame synchronization scrambling to the image signals. The frame synchronization scrambling is processing of scrambling signals, for example, by setting an initial value of a scrambler into a predetermined value such as all "0" during one frame period or one line period from an active video period next to SAV. Then, the scrambler 33-1 performs scrambling to image signals of respective pixels to be the 16-bit data length and stores the signals in the RAM 34-2.

Additionally, the scrambler 33-2 performs frame synchronization scrambling to the reference signal of all "0" and scrambles image signals of respective image signals into the 16-bit data length, then, stores the signals in the RAM 34-4.

Here, the frame synchronization scrambling is processing of setting a register initialization value in a checking polynomial of a pseudo random pattern into a given value such as all "0" at certain timing such as at the head of the frame or the line to be added to input data by a modulo-2 arithmetic. In the signal receiving apparatus receiving image signals, the register having the same checking polynomial is set to the same value as the signal transmission apparatus. Then, the modulo-2 arithmetic is performed to the input data at the same timing as the signal transmission apparatus, thereby reproducing the original data.

Next, the write control unit 37-1 multiplexes signals in the order of B/R odd-numbered ch, Gch, B/R odd-numbered ch, Gch, B/R odd-numbered ch, Gch . . . to be stored in the RAM 35-1 as well as HD-SDI. After that, the parallel/serial conversion unit 36-1 outputs 1 ch serial digital data of the data structure shown in FIG. 11A at 10.692 Gbps.

Similarly, the write control unit 37-2 multiplexes signals in the order of B/R even-numbered ch, Gch, B/R even-numbered ch, Gch, B/R even-numbered ch, Gch . . . to be stored in the RAM 35-2. After that, the parallel/serial conversion unit 36-2 outputs 1 ch serial digital data of the data structure shown in FIG. 11B at 10.692 Gbps.

In the embodiment, the 4 k×2 k signal/4:4:4 (RGB) signals shown in FIG. 2 and FIG. 5 or signals obtained by multiplexing the signals to 5.94 Gbps 2 ch is received, decodes the signals by 8 B/10 B after detecting the TRS, then, the B/R odd-numbered channel is 8 B/10 B converted from the head of SAV to thereby convert respective pixels into 20-bit. On the other hand, Gch is decoded by 8 B/10 B after detecting the TRS, then, the frame synchronization scrambling is performed, for example, by setting the initial value of the scrambler into a predetermined value such as all "0" during one frame period or one line period from the active video period next to SAV to output 16-bit signals. The signals are multiplexed in the order of B/R odd-numbered ch, Gch, B/R odd-numbered ch, Gch, B/R odd-numbered ch, Gch . . . to be outputted as a signal of 10.692 Gbps as well as HD-SDI.

Concerning the B/R even-numbered channel, 8 B/10 B conversion is performed from the head of SAV of the B/R even-numbered channel, and respective pixels are converted into 20-bit. For example, signals obtained by setting the initial value of the scrambler into a predetermined value such as all "0" during one frame period or one line period from the active video period next to SAV are outputted in units of 16-bit and multiplexed. Accordingly, the signal of B/R even-numbered ch, Scr, B/R even-numbered ch, Scr, B/R even-numbered ch and Scr can be obtained.

FIGS. 11A and 11B show a data structure in the case of multiplying all samples into a single link.

Here, an example of the data structure of 10.692 Gbps obtained by multiplexing all samples into a single link in the case of the frame rate of 30 P is shown.

A case of B/Rch $$4400 \text{ pixels} \times 2250 \text{ lines} \times 30 \text{ P} \times 16\text{-bit} \times 10/8 = 5.94 \text{ Gbps} \quad (1)$$

(2) A case of Gch $$4400 \text{ pixels} \times 2250 \text{ lines} \times 30 \text{P} \times 16\text{-bit} = 4.752 \text{ Gbps} \quad (2)$$

$$5.94 \text{ Gbps} + 4.752 \text{ Gbps} = 10.692 \text{ Gbps} \quad (3)$$

Cases of 24 P, 25 P can be calculated in the same manner. Calculation of the data amount of H-blanking excluding SAV/EAV Next, the data amount of H-blanking will be calculated.

$$30 \text{ P}: (4400 - 4096 - 12(\text{SAV/EAV})) \times 2 \times 16 \times 36/32 = 10512 \text{ bits} \quad (1)$$

$$25 \text{ P}: (5280 - 4096 - 12(\text{SAV/EAV})) \times 2 \times 16 \times 36/32 = 42192 \text{ bits} \quad (2)$$

$$24 \text{ P}: (5500 - 4096 - 12(\text{SAV/EAV})) \times 2 \times 16 \times 36/32 = 50112 \text{ bits} \quad (3)$$

When it is necessary to multiplex the ANC/audio signal, data is multiplexed on the high order 10 bits in 16-bit so as to comply with SMPTE 291, SMPTE 299 and the like which are ANC/audio standards for HD-SDI. Here, audio data is multiplexed on B/Rch and an audio control packet is multiplexed on Gch. When audio data of 48 kHz audio is 16 ch, 31 samples×4=124 samples. Here, when the frame rate is 30 P, 4400−4160=240 samples. When SAV/EAV/LC/CRCC are 12 samples when all added, therefore, the remaining regions are 240−12=228 samples. Accordingly, the data amount of 124 samples necessary for 16 ch audio data can be stored in the regions of 228 samples. That is, audio data of HD-SDI can be multiplexed on the regions of 228 samples.

However, the data amount of H-blanking is smallest in the case of 30 P, therefore, it is most difficult to secure space for multiplexing ANC/audio data. Here, a result of 48 kHz÷30 frames÷2250 lines=0.7111 sample lines is obtained in the case of 30 P. The result indicates that 0.7111 samples can be multiplexed per 1 line. For example, when sampling of audio (taking in audio) is assumed to be 0.7111 . . . in a period of 1 line, 1/0.7111 can be derived. This largely means that there are audio samples twice in 3 lines. Accordingly, it is found that ANC/audio data can be multiplexed without problems.

In the signal processing unit 30 according to the third embodiment described above, 4 k×2 k/23.98 P-30 P/4:4:4 (RGB)/16-bit image signals read from the imaging device can be transmitted at 2 ch 10.692 Gbps by using the 8 B/10 B code and the scrambler. Here, the TRS detection units 31-1, 31-2 can identify SAV/EAV at the timing of SAV/EAV prescribed by the data structure shown in FIGS. 11A and 11B and can identify the start timing of SAV/EAV.

As data from all "0" to all "1" can be used as the 16-bit image signals, the technique is extremely effective when the quantization bit rate is high in video expression such as 16-bit.

When it is necessary to multiplex the ANC/audio signal, data can be multiplexed on the high order 10 bits in 16-bit so as to comply with SMPTE 291, SMPTE 299 and the like which are ANC/audio standards for HD-SDI.

4. FOURTH EMBODIMENT

An Example of Transmitting 4 k×2 k/47.95 P-60 P/4:4:4 (RGB)/16-Bit Signals at 3 ch 10.692 Gbps by Using a 8 B/10 B Code and Scramble Next, an operation example of the camera 1 according to a fourth embodiment of the invention will be explained with reference to FIG. 12 to FIGS. 13A to 13C.

Here, a method of transmitting 4 k×2 k/47.95 P-60 P/4:4:4 (RGB)/16-bit signals at 3 ch 10.692 Gbps by using the 8 B/10 B code and scramble will be explained.

Figure 12:
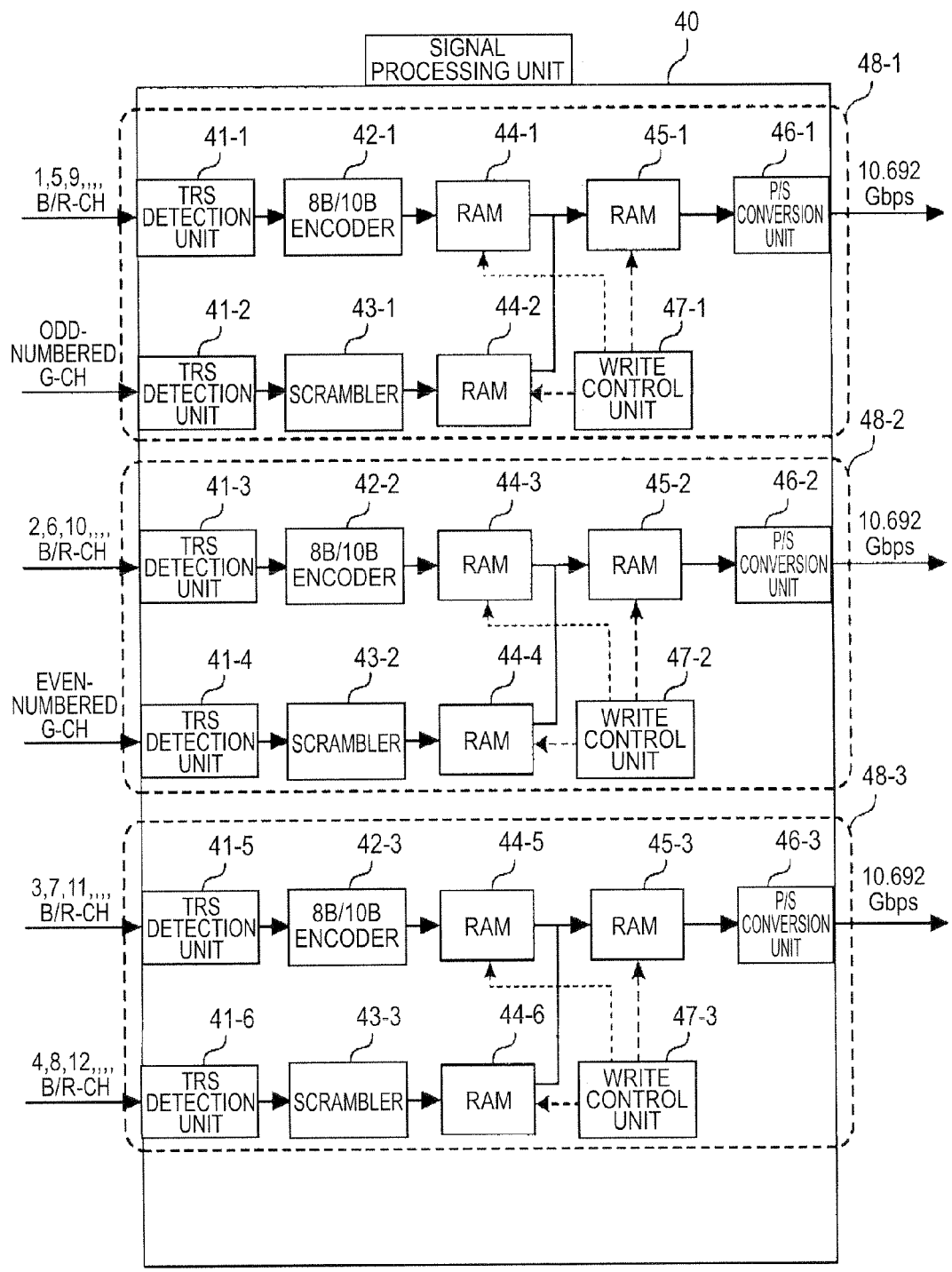
FIG. 12 is a block diagram showing an internal configuration example of a signal processing unit according to a fourth embodiment of the invention.

FIG. 12 shows an internal configuration example of a signal processing unit 40.

The signal processing unit 40 performs the following processing when frame rates of image signals inputted from the imaging sensor 11 are 47.95 P, 48 P, 50 P, 59.94 P and 60 P. In this case, it is necessary that the image sensor 11 includes 4096×2160 pixels and the quantization bit rate of image signals outputted from the pixels is 16-bit.

The signal processing unit 40 includes a first signal output unit 48-1 performing processing to B/Rch inputted from B, R pixels arranged at the 1+4(n−1)th samples inputted from the signal multiplex unit 17 when "n" is a natural number. The first signal output unit 48-1 performs 8 B/10 B encoding to active regions of HD-SDI in B/Rch. Additionally, the first signal output unit 48-1 performs frame synchronization scrambling to active regions of HD-SDI in Gch inputted from G-pixels arranged at odd-numbered samples. Then, the first signal output unit 48-1 converts parallel digital data to serial digital data and outputs the data in the transmission format of 10.692 Gbps.

The signal processing unit 40 also includes a second signal output unit 48-2 performing processing to B/Rch inputted from B, R pixels arranged at the 2+4(n−1)th samples inputted from the signal multiplex unit 17. The second signal output unit 48-2 performs 8 B/10 B encoding to active regions of HD-SDI in B/Rch. Additionally, the second signal output unit 48-2 performs frame synchronization scrambling to active regions of HD-SDI in Gch inputted from G-pixels arranged at even-numbered samples. Then, the second signal output unit 48-2 converts parallel digital data to serial digital data and outputs the data in the transmission format of 10.692 Gbps.

The signal processing unit 40 also includes a third signal output unit 48-3 performing processing to B/Rch inputted from B, R pixels arranged at the 3+4(n−1)th samples inputted from the signal multiplex unit 17. The third signal output unit 48-3 performs 8 B/10 B encoding to active regions of HD-SDI in B/Rch. Additionally, the third signal output unit 48-3 performs frame synchronization scrambling to active regions of HD-SDI in Gch inputted from B, R pixels arranged at the 4+4(n−1)th samples. Then, the third signal output unit 48-3 converts parallel digital data to serial digital data and outputs the data in the transmission format of 10.692 Gbps.

The first signal output unit 48-1 includes a TRS detection unit 41-1 detecting the multiplexed TRS from HD-SDI in B/Rch of 1, 5, 9, . . . sample pixels inputted from the signal multiplex unit 17. The first signal output unit 48-1 also includes a TRS detection unit 41-2 detecting the multiplexed TRS from HD-SDI in Gch of odd-numbered sample pixels.

The first signal output unit 48-1 includes an 8 B/10 B encoder 42-1 performing encoding to active regions of HD-SDI in B/Rch in which the TRS has been detected by the TRS detection unit 41-1. A RAM 44-1 storing 8 B/10 B encoded data by the 8 B/10 B encoder 42-1 is also included.

The first signal output unit 48-1 further includes a scrambler 43-1 performing frame synchronization scrambling to active regions of HD-SDI in Gch in which the TRS has been detected by the TRS detection unit 41-2. The first signal output unit 48-1 includes a RAM 44-2 storing data scrambled by the scrambler 43-1.

The first signal output unit 48-1 includes a RAM 45-1 storing data read from the RAMs 44-1, 44-2 in a given data structure. Writing and reading of data with respect to the RAMs 44-1, 44-2 and 45-1 are performed by control of a write control unit 47-1.

The first signal output unit 48-1 also includes a parallel/serial conversion unit 46-1 converting parallel digital data read from the RAM 45-1 into serial digital data and outputs the data in the transmission format of 10.692 Gbps.

The HD-SDI in B/Rch of 2, 6, 10, . . . sample pixels and HD-SDI in Gch of even-numbered sample pixels are inputted to the signal processing unit 40. The configuration in which the TRS is detected and the 8 B/10 B encoding or scrambling is performed to these inputted HD-SDIs and output them in the transmission format of 10.692 Gbps is the same in the above configuration, therefore, the detailed explanation is omitted.

The HD-SDI in B/Rch of 3, 7, 11, . . . sample pixels and HD-SDI in B/Rch of 4, 8, 12, . . . sample pixels are also inputted to the signal processing unit 40. The configuration in which the TRS is detected and the 8 B/10 B encoding or scrambling is performed to these inputted HD-SDIs and output them in the transmission format of 10.692 Gbps is the same in the above configuration, therefore, the detailed explanation is omitted.

Next, an operation example of the first signal output unit 48-1 will be explained.

Figure 13A:
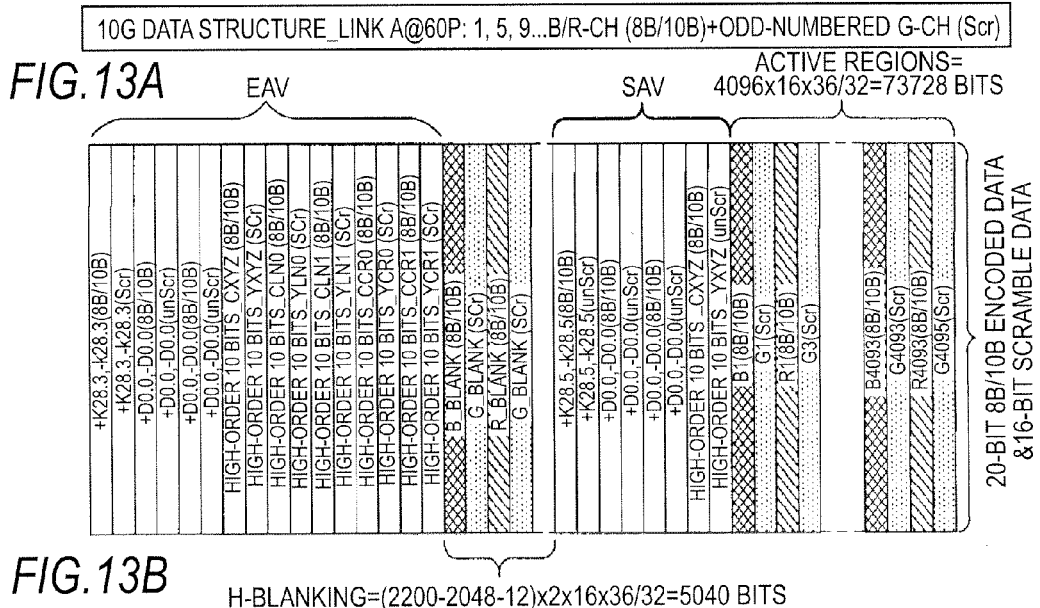
FIGS. 13A to 13C are explanatory views showing examples of data structures in which image signals are transmitted at 10.692 Gbps according to the fourth embodiment of the invention.

The TRS detection unit 41-1 receives 4 k×2 k signals of the RGB full pixel structure or signals obtained by multiplexing the signals to 5.94 Gbps. At this time, the 8 B/10 B encoder 42-1 performs 8 B/10 B conversion from the head of SAV concerning B/Rch as shown in FIG. 13A. The 8 B/10 B encoder 42-1 converts image signals of respective pixels into 20-bit data length and stores the signals in the RAM 44-1.

On the other hand, when the TRS detection unit 41-2 receives image signals of Gch in odd-numbered samples, the scrambler 43-1 performs frame synchronization scrambling to the image signals. At this time, the scrambler 43-1 performs frame synchronization scrambling by setting an initial value of the scrambler, for example, during one frame period or during one line period from the head of SAV to a predetermined value such as all "0". Then, the scrambler 43-1 performs scrambles to image signals of respective pixels into 16-bit data length and stores the signals in the RAM 44-2.

Next, the write control unit 47-1 multiplexes image signals in the order of B/Rch, Gch, B/Rch, Gch, B/Rch, in the same manner as HD-SDI and stores the signals in the RAM 45-1. After that, the parallel serial conversion unit 46-1 outputs a signal as a 10.692 Gbps signal of the data structure shown in FIG. 13A.

A case of 1, 5, 9 . . . /2, 6, 10 . . . /3, 7, 11 . . . samples B/Rch:

$$4400 \text{ pixels} \div 2 \times 2250 \text{ lines} \times 60 \text{ P} \times 16\text{-bit} \times 10/8 = 5.94 \text{ Gbps} \quad (1)$$

A case of odd-numbered/even-numbered samples Gch, 4, 8, 12 . . . samples B/Rch:

$$4400 \text{ pixels} \div 2 \times 2250 \text{ lines} \times 60 \text{ P} \times 16\text{-bit} = 4.752 \text{ Gbps} \quad (2)$$

$$5.94 \text{ Gbps} + 4.752 \text{ Gbps} = 10.692 \text{ Gbps} \quad (3)$$

Cases of 48 P, 50 P can be calculated in the same manner. Calculation of the Data Amount in the first ch, the second ch and the third H-blanking of 10.692 Gbps excluding SAV/EAV $$60 \text{ P}: (2200-2048-12(\text{SAV/EAV})) \times 2 \times 16 \times 36/32 = 5040 \text{ bits} \quad (1)$$

$$50 \text{ P}: (2640-2048-12(\text{SAV/EAV})) \times 2 \times 16 \times 36/32 = 20880 \text{ bits} \quad (2)$$

$$48 \text{ P}: (2750-2048-12(\text{SAV/EAV})) \times 2 \times 16 \times 36/32 = 24840 \text{ bits} \quad (3)$$

When it is necessary to multiplex the ANC/audio signal, data is multiplexed on the high order 10 bits in 16-bit so as to comply with SMPTE 291, SMPTE 299 and the like which are ANC/audio standards for HD-SDI. When audio data of 48 kHz audio is 16 ch, 31 bytes×4=124 bytes. The value is lower than (240÷2−12)×2=216 samples in 60 P, therefore, the audio data can be multiplexed.

The data amount of H-blanking is smallest in the case of 60 P. Therefore, it is difficult to secure space for multiplexing. Here, in the case of 60 P, a result of 48 kHz÷60 frames÷2250 lines=0.3555 sample lines can be obtained. The result indicates that 0.3555 samples can be multiplexed per 1 line (for example, there exists a line with the audio sample in three lines). Accordingly, it is found that ANC/audio data can be multiplexed without problems.

The signal processing unit 40 receives 4 k×2 k/4:4:4 (RGB) signals or signals obtained by multiplexing the 4 k×2 k signals to 6 ch 5.94 Gbps, detecting the TRS and performing 8 B/10 B decoding, in which B/Rch is 8 B/10 B converted from the head of SAV to convert each pixel to 20-bit. On the other hand, Gch is 8 B/10 B decoded after detecting the TRS, then, the frame synchronization scrambling is performed by setting the initial value of the scrambler to a predetermined value such as all "0" during one frame period or during one line period from the head of SAV to output the 16-bit signals. These signals are multiplexed in the order of B/Rch, Gch, B/Rch, Gch, B/Rch, in the same manner as HD-SDI and outputted as 3 ch 10.692 Gbps signals of the data structure shown in FIGS. 13A to 13C.

Figure 13B:
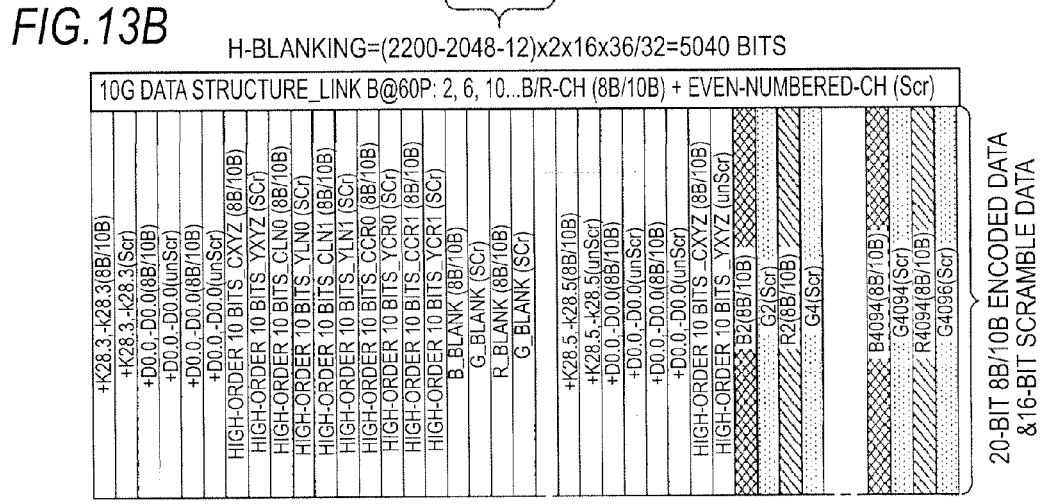
Figure 13C:
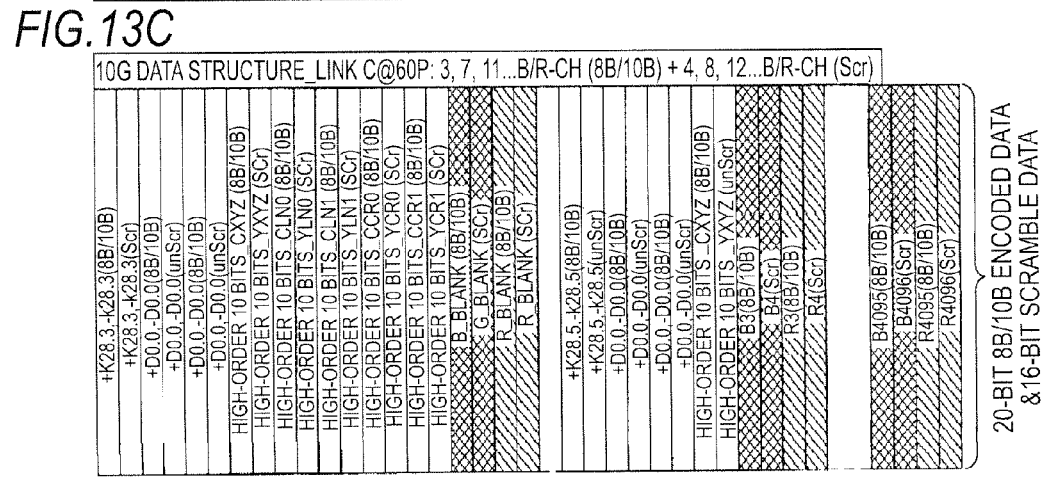

FIGS. 13A to 13C show data structures corresponding to Cch, Ych of HD-SDI.

Here, examples in which odd-numbered samples are multiplexed on Link A and even-numbered samples are multiplexed on Link B in the case of the frame rate of 60 P are shown.

In the signal processing unit 40 according to the fourth embodiment described above, the 4 k×2 k/47.95 P-60 P/4:4:4 (RGB)/16-bit signals read from the imaging device can be transmitted at 3 ch 10.692 Gbps by using the 8 B/10 B code and the scrambler. The pulse for identifying SAV/EAV is received as shown in FIG. 12 at the timing of SAV/EAV prescribed by the data structures shown in FIGS. 13A to 13C. Accordingly, the 6 G multiplexer FPGA 20 can identify the start timing of SAV/EAV by using XYZ multiplexed on SAV, EAV.

Additionally, data from all "0" to all "1" can be used as the 16-bit image signals, therefore, this is extremely effective when the quantization bit rate is high in video expression such as 16-bit.

When it is necessary to multiplex the ANC/audio signal, data is multiplexed on the high order 10-bit in 16-bit so as to comply with SMPTE 291, SMPTE 299 and the like which are ANC/audio standards for HD-SDI.

5. FIFTH EMBODIMENT

An Example of Transmitting CinemaScope (Aspect Ratio 1:2.4) 4 k×2 k/4:4:4 (RGB)/36 P/16-Bit Signals at 2 ch 10.692 Gbps by Using the 8 B/10 B Code and Scramble Next, an operation example of the camera 1 according to a fifth embodiment of the invention will be explained with reference to FIG. 14.

Here, a method of transmitting CinemaScope 4 k×2 k/4:4:4 (RGB)/36 P/16-bit signals at 2 ch 10.692 Gbps by using the 8 B/10 B code and scramble will be explained.

FIG. 14 is an example of CinemaScope.

When transmitting CinemaScope data of 36 P having the aspect ratio of 1:2.4=1784:4096, the total number of lines is assumed to be 1875 lines. Here, 32 pixels are provided respectively at right and left as a margin in the horizontal direction and 22 pixels are provided respectively at up and down as a margin in the vertical direction. Accordingly, the total number of pixels will be (4096+32×2)×(1875+22×2) =4160×1919. In this case, the following expression holds.

10.692 Gbps÷36 P÷1875 lines=158400 bits/line

Though video data of 16-bit is supplied from the signal processing unit 12 in the same method as FIG. 5, the number of lines is reduced to 1875 lines as the aspect ratio is increased. However, the number of effective samples is the same as the 4 k×2 k signals in 30 P shown in the first embodiment including the number of pixels in the additional effective area and H-blanking. Accordingly, the CinemaScope 36 P can be transmitted in 2 ch by being multiplexed to 10.692 Gbps with the same data structure as in the 4 k×2 k signals in 30 P according to the third embodiment though the aspect ratio in the CinemaScope screen and the frame rate are different.

A case of B/R odd-numbered ch:

4400 pixels×1875 lines×36 P×16-bit×10/8=5.94 Gbps     (1)

A case of Gch 4400 pixels×1875 lines×36 P×16-bit=4.752 Gbps     (2)

5.94 Gbps+4.752 Gbps=10.692 Gbps

A case of B/R even-numbered ch:

4400 pixels×1875 lines×36 P×16-bit×10/8=5.94 Gbps     (4)

A case of scrambled ch:

4400 pixels×1875 lines×36 P×16-bit=4.752 Gbps     (5)

5.94 Gbps+4.752 Gbps=10.692 Gbps     (6)

Concerning ANC/audio multiplexing, the signal can be transmitted in the same manner as the third embodiment, therefore, the explanation is omitted here.

As described above, the signal processing unit according to the fifth embodiment performs processing of multiplexing the image signals when the frame rate of the image signals inputted from the image sensor 11 is 36 P. At this time, it is necessary that the image sensor 11 includes 4096×1875 pixels with the aspect ratio of 1:2.4, and the quantization bit rate of the image signals outputted from the pixels is 16-bit. A not-shown parallel-serial conversion unit outputs 2 ch serial digital data at 10.692 Gbps.

In the signal processing unit according to the fifth embodiment, the 4 k×2 k/4:4:4 (RGB)/36 P/16-bit signals read from the imaging device of CinemaScope can be transmitted at 2 ch 10.692 Gbps by using the 8 B/10 B code and scramble. Accordingly, the TRS detection units 31-1, 31-2 can identify SAV/EAV at the timing of SAV/EAV prescribed by the data structure shown in FIGS. 11A and 11B and can identify the start timing of SAV/EAV.

6. SIXTH EMBODIMENT

An Example of Transmitting CinemaScope (aspect ratio 1:2.4) 4 k×2 k/4:4:4 (RGB)/72 P/16-Bit Signals at 3 ch 10.692 Gbps by Using the 8 B/10 B Code and Scramble Next, an operation example of the camera 1 according to a sixth embodiment of the invention will be explained.

Here, a method of transmitting the CinemaScope 4 k×2 k/4:4:4 (RGB)/72 P/16-bit signals at 3 ch 10.692 Gbps by using the 8 B/10 B code and scramble will be explained.

The signal processing unit 40 performs the following processing when the frame rate of image signals inputted from the image sensor 11 is 72 P. In this case, it is necessary that the image sensor 11 includes 4096×2160 pixels and the quantization bit rate of image signals outputted by the pixels is 16-bit. Here, when CinemaScope data 72 P having the aspect ratio of 1:2.4=1784:4096 is transmitted, the whole number of lines is 1875 lines.

$$10.692 \div 72\ P \div 1875\ lines = 79200\ bits/line$$

The 16-bit data is supplied from the signal processing unit 12 in the same manner as FIG. 5. The number of lines is reduced to 1875 lines as the aspect ratio is increased, however, the number of effective samples is the same as the 4 k×2 k signals in 60 P shown in the second embodiment including the number of pixels of the additional effective area and H-blanking. Accordingly, the CinemaScope 72 P of serial digital data can be transmitted in 3 ch by being multiplexed to 10.692 Gbps with the same data structure as in the fourth embodiment though the aspect ratio and the frame rate are different.

A case of 1, 5, 9, 13, . . . B/Rch:

$$4400\ pixels \div 2 \times 1875\ lines \times 72\ P \times 16\text{-bit} \times 10/8 = 5.94\ Gbps \quad (1)$$

A case of odd-numbered Gch:

$$4400\ pixels \div 2 \times 1875\ lines \times 72\ P \times 16\text{-bit} = 4.752\ Gbps \quad (2)$$

$$5.94\ Gbps + 4.752\ Gbps = 10.692\ Gbps \quad (3)$$

A case of 2, 6, 10, 14, . . . B/Rch:

$$4400\ pixels \div 2 \times 1875\ lines \times 72\ P \times 16\text{-bit} \times 10/8 = 5.94\ Gbps \quad (4)$$

A case of even-numbered Gch:

$$4400\ pixels \div 2 \times 1875\ lines \times 72\ P \times 16\text{-bit} = 4.752\ Gbps \quad (5)$$

$$5.94\ Gbps + 4.752\ Gbps = 10.692\ Gbps \quad (6)$$

A case of 3, 7, 11, 15, . . . B/Rch:

$$4400\ pixels \div 2 \times 1875\ lines \times 72\ P \times 16\text{-bit} \times 10/8 = 5.94\ Gbps \quad (7)$$

A case of 4, 8, 12, 16, . . . B/Rch:

$$4400\ pixels \div 2 \times 1875\ lines \times 72\ P \times 16\text{-bit} = 4.752\ Gbps \quad (8)$$

$$5.94\ Gbps + 4.752\ Gbps = 10.692\ Gbps \quad (9)$$

ANC/audio multiplexing is the same as the fourth embodiment.

In the signal processing unit according to the six embodiment described above, the 4 k×2 k/4:4:4 (RGB)/72 P/16-bit signals read from the imaging device of CinemaScope (aspect ratio 1:2.4) can be transmitted at 3 ch 10.692 Gbps by using the 8 B/10 B code and scramble. Accordingly, the TRS detection units 31-1, 31-2 can identify SAV/EAV at the timing of SAV/EAV prescribed by the data structures shown in FIGS. 13A to 13B and can identify the start timing of SAV/EAV.

When applying the signal processing units according to the above first to sixth embodiments, the following advantages can be obtained.

The 4 k×2 k/4:4:4 (RGB) signals can be transmitted by being multiplexed to 3 ch or 6 ch 5.94 Gbps, or 2 ch or 3 ch 10.692 Gbps which is the same transmission rate as current SMPTE 435. Additionally, the 8 B/10 B code is used, thereby avoiding occurrence of a pathological signal such as in HD-SDI and utilizing commercial devices for 10 GE.

The signal processing unit 12 and the 6 G multiplexer FPGA 20 are formed to be the configuration and wiring shown in FIG. 5 and FIG. 7 in the 4 k×2 k/4:4:4 (RGB)/23.98 P-30 P as well as 47.95-60 P, the same 148.5 MHz clock is used without changing the clock frequency. Accordingly, it is possible to switch between 23.98 P-30 P and 47.95 P-60 P without changing connection and setting of the clock, therefore, a hardware (circuit) scale of the clock system can be reduced to the minimum.

As shown in FIG. 5 and FIG. 7, SAV/EAV is multiplexed at the start and end of the effective area of data in the signal processing unit 12, and the timing pulse corresponding to SAV/EAV and XYZ multiplexed on SAV/EAV are used to enable identification of SAV/EAV. Therefore, it is not necessary to provide prohibition codes in video data. Accordingly, it is possible to use all "0" to all "1" as the 16-bit image signals and the 16-bit image signals can be practically used at the maximum.

The 4 k×2 k signals of the RGB full pixel structure as well as the CinemaScope signals can be transmitted by being multiplexed to 3 ch or 6 ch 5.94 Gbps, or 2 ch or 3 ch 10.692 Gbps which is the same transmission rate as current SMPTE 435. Additionally, the 8 B/10 B code is used, thereby avoiding occurrence of a pathological signal such as in HD-SDI and utilizing commercial devices for 10 GE.

The interface data structure of the 4 k×2 k/4:4:4 (RGB)/16-bit can be designed to a data structure similar to Ych, Cch of HD-SDI, thereby allowing an engineer familiar with the HD signal to comprehend the format easily as well as preventing errors. Additionally, XYZ of HD-SDI is used, thereby defining breakpoints such as effective frames or effective lines.

The invention is not limited to embodiments and can be apply various applications and modification examples within a scope not departing from the gist of the invention described in claims.

The present application contains subject matter related to that disclosed in Japanese Priority Patent Application JP 2010-107069 filed in the Japan Patent Office on May 7, 2010, the entire contents of which is hereby incorporated by reference.

What is claimed is:

1. A signal transmission apparatus comprising:
 a multiplex unit generating B/Rch by multiplexing image signals read from B, R pixels arranged in the same sample alternately on active regions corresponding to Cch in High Definition Serial Digital Interface (HD-SDI) with a start code similar to Start Active Video (SAV) or End Active Video (EAV), in which image signals sequentially read in a line direction and inputted with a given number of samples from an imaging device having an RGB full pixel structure in which R, G and B pixels disposed in one sample respectively output R, G and B image signals, as well as generating Gch by sequentially multiplexing image signals read from samples of G pixels adjacent in the line direction on active regions corresponding to Ych in HD-SDI with the start code; and
 an 8B/10B encoder outputting serial digital data obtained by 8B/10B encoding and converting active regions in the B/R ch and the Gch having the data structure corresponding to HD-SDI as well as auxiliary data regions including SAV, EAV, Line Number (LN) and error detection code (CRCC).

2. The signal transmission apparatus according to claim 1, wherein the multiplex unit multiplexes ANC/audio data in a horizontal auxiliary data space of HD-SDI when the image signal includes ANC/audio data.

3. The signal transmission apparatus according to claim 1, wherein the multiplex unit includes
a timing pulse generation unit generating a timing pulse for multiplexing image signals on the active regions in B/Rch or Gch of HD-SDI by receiving a read clock for controlling the timing of reading the image signals from the imaging device and timing information of an active video period which is the information of the effective video period in which video data is superimposed on the image signals, and
a switching control unit switching the timing of reading image signals from the imaging device based on the timing pulse received from the timing pulse generation unit to multiplex the image signals on the active regions in B/Rch or Gch of HD-SDI.

4. The signal transmission apparatus according to claim 3, wherein +k28.5, −k28.5, D0.0, D0.0, D0.0 and D0.0 before 8B/10B converted are inserted into regions to which SAV of HD-SDI is inserted, in which the start code is inserted in high order 10 bits, and
+k28.3, −k28.3, D0.0, D0.0, D0.0 and D0.0 before 8B/10B converted are inserted into regions to which EAV of HD-SDI is inserted, in which the start code is inserted in high order 10 bits, LN0 is inserted in high order 10 bits, LN1 is inserted in the high order 10 bits, CRC0 is inserted in the high order 10 bits and CRC1 is inserted in high order 10 bits.

5. The signal transmission apparatus according to claim 4, wherein, when frame rates of the image signals inputted from the imaging device are 23.98P, 24P, 25P, 29.97P and 30P and the imaging device includes pixels of 4096×2160 samples and a quantization bit rate of image signals outputted from the pixels is 16-bit, the multiplex unit outputs 2ch serial digital data obtained by multiplexing the image signals on active regions corresponding to Cch in units of respective even numbered samples or odd numbered samples in the B, R pixels read at the same time, and outputs 1ch serial digital data obtained by multiplexing the image signals on active regions corresponding to Ych in respective adjacent samples of G pixels at 5.94 Gbps.

6. The signal transmission apparatus according to claim 4, wherein, when frame rates of the image signals inputted from the imaging device are 47.95P, 48P, 50P, 59.94P and 60P and the imaging device includes pixels of 4096×2160 samples and a quantization bit rate of image signals outputted from the pixels is 16-bit, the multiplex unit outputs 4ch serial digital data obtained by multiplexing the image signals on active regions corresponding to Cch in units of respective even numbered samples or odd numbered samples in the B, R pixels read at the same time, and outputs 2ch serial digital data obtained by multiplexing the image signals in respective adjacent samples of G pixels on active regions corresponding to Ych at 5.94 Gbps.

7. The signal transmission apparatus according to claim 1, further comprising:
a first Time Reference Signal (TRS) detection unit detecting a TRS from the signal having the data structure corresponding to HD-SDI in a B/R odd-numbered channel or a B/R even-numbered channel inputted from the signal multiplex unit;
a 8B/10B encoder performing 8B/10B encoding to active regions of the signal having the data structure corresponding to HD-SDI in the B/R odd-numbered channel or the B/R even-numbered channel in which the TRS has been detected by the first TRS detection unit;
a second TRS detection unit detecting a TRS from the signal having the data structure corresponding to HD-SDI in Gch inputted from the multiplex unit;
a scrambler performing frame synchronization scrambling to the active regions of the signal having the data structure corresponding to HD-SDI in the Gch in which the TRS has been detected by the second TRS detection unit; and
a parallel/serial conversion unit converting parallel digital data which is inputted in parallel from the 8B/10B encoder and the scrambler into serial digital data and outputting the data.

8. The signal transmission apparatus according to claim 7, wherein, when frame rates of the image signals inputted from the imaging device are 23.98P, 24P, 25P, 29.97P and 30P and the imaging device includes 4096×2160 pixels and a quantization bit rate of image signals outputted from the pixels is 16-bit, the parallel/serial conversion unit outputs the serial digital data of 2ch at 10.692 Gpbs.

9. The signal transmission apparatus according to claim 7, wherein, when the frame rate of the image signals inputted from the imaging device is 36P with the aspect ratio of the imaging device is 1:2.4 and the imaging device includes 4096×1875 pixels as well as a quantization bit of image signals outputted from the pixels is 16-bit, the parallel serial conversion unit outputs 2ch serial digital data at 10.692 Gbps.

10. The signal transmission apparatus according to claim 1, further comprising:
a first signal output unit performing 8B/10B encoding to active regions of HD-SDI in the B/Rch inputted from B, R pixels arranged at the 1+4(n−1)th samples inputted from the multiplex unit when "n" is a natural number, performing frame synchronization scrambling to the active regions of HD-SDI in the Gch inputted from G pixels arranged at odd-numbered samples and converting parallel digital data into serial digital data to output the data in the transmission format of 10.692 Gbp;
a second signal output unit performing 8B/10B encoding to active regions of HD-SDI in the B/Rch inputted from B, R pixels arranged at the 2+4(n−1)th samples inputted from the multiplex unit, performing frame synchronization scrambling to the active regions of HD-SDI in the Gch inputted from G pixels arranged at even-numbered samples and converting parallel digital data into serial digital data to output the data in the transmission format of 10.692 Gbp; and
a third signal output unit performing 8B/10B encoding to active regions of HD-SDI in the B/Rch inputted from B, R pixels arranged at the 3+4(n−1)th samples inputted from the multiplex unit, performing frame synchronization scrambling to the active regions of HD-SDI in the B/Rch inputted from B, R pixels arranged at the 4+4(n−1)th samples and converting parallel digital data into serial digital data to output the data in the transmission format of 10.692 Gbp.

11. The signal transmission apparatus according to claim 10, wherein, when frame rates of the image signals inputted from the imaging device are 47.95P, 48P, 50P, 59.94P and 60P and the imaging device includes 4096×2160 pixels and a quantization bit rate of image signals outputted from the pixels is 16-bit, the parallel/serial conversion unit outputs the serial digital data of 3ch at 10.692 Gpbs.

12. The signal transmission apparatus according to claim 10,
wherein, when the frame rate of the image signals inputted from the imaging device is 72P and the imaging device includes 4096×1875 pixels with the aspect ratio of 1:2.4 and a quantization bit rate of image signals outputted from the pixels is 16-bit, the parallel/serial conversion unit outputs the serial digital data of 3ch at 10.692 Gpbs.

13. A signal transmission method comprising the steps of:
generating B/Rch by multiplexing image signals read from B, R pixels alternately arranged in the same sample on active regions corresponding to Cch in High Definition Serial Digital Interface (HD-SDI) with a start code similar to Start Active Video (SAV) or End Active Video (EAV), in which image signals sequentially read in a line direction and inputted with a given number of samples from an imaging device having an RGB full pixel structure in which R, G and B pixels disposed in one sample respectively output R, G and B image signals, as well as generating Gch by sequentially multiplexing image signals read from samples of G pixels adjacent in the line direction on active regions corresponding to Ych in HD-SDI with the start code; and
outputting serial digital data obtained by 8B/10B encoding and converting active regions in B/R ch and Gch having the data structure corresponding to HD-SDI as well as auxiliary data regions including SAV, EAV, Line Number (LN) and error detection code (CRCC).

* * * * *